United States Patent
Oh et al.

(10) Patent No.: US 10,923,084 B2
(45) Date of Patent: Feb. 16, 2021

(54) METHOD AND SYSTEM OF DE-INTERLACING FOR IMAGE PROCESSING

(71) Applicant: Intel Corporation, Santa Clara, CA (US)

(72) Inventors: Jong Dae Oh, San Jose, CA (US); Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 47 days.

(21) Appl. No.: 16/369,469

(22) Filed: Mar. 29, 2019

(65) Prior Publication Data

US 2019/0251931 A1    Aug. 15, 2019

(51) Int. Cl.
| | |
|---|---|
| *H04N 7/01* | (2006.01) |
| *G06T 7/20* | (2017.01) |
| *G09G 5/393* | (2006.01) |
| *G06T 7/13* | (2017.01) |
| *G06T 7/246* | (2017.01) |

(52) U.S. Cl.
CPC .............. *G09G 5/393* (2013.01); *G06T 7/13* (2017.01); *G06T 7/20* (2013.01); *G06T 7/246* (2017.01); *H04N 7/012* (2013.01); *G09G 2310/0229* (2013.01)

(58) Field of Classification Search
None
See application file for complete search history.

(56) References Cited

U.S. PATENT DOCUMENTS

| | | | | |
|---|---|---|---|---|
| 5,874,991 A * | 2/1999 | Steinberg | ............... | H04N 17/00 348/177 |
| 6,262,773 B1 * | 7/2001 | Westerman | ............ | H04N 7/012 348/448 |
| 6,404,461 B1 * | 6/2002 | Le Clerc | .................. | H04N 7/01 348/700 |
| 7,075,581 B1 * | 7/2006 | Ozgen | .................. | G11B 27/034 348/441 |
| 2006/0188018 A1 * | 8/2006 | Lin | ...................... | H04N 19/102 375/240.16 |
| 2008/0106642 A1 * | 5/2008 | Srinivasan | ............. | H04N 5/144 348/452 |
| 2009/0207316 A1 * | 8/2009 | Cupal | .................... | G11B 27/34 348/700 |
| 2010/0188571 A1 * | 7/2010 | Wei Yin | ................. | H04N 5/144 348/453 |
| 2015/0208025 A1 * | 7/2015 | Chen | .................... | H04N 7/0157 348/452 |

* cited by examiner

*Primary Examiner* — Joni Hsu
(74) *Attorney, Agent, or Firm* — Green, Howard & Mughal LLP.

(57) ABSTRACT

Methods, articles, and systems are described for de-interlacing for image processing with reduced artifacts.

25 Claims, 13 Drawing Sheets

---

200

OBTAIN IMAGE DATA OF FIELDS OF A VIDEO SEQUENCE COMPRISING CURRENT FIELDS TO BE DE-INTERLACED INTO A CURRENT FRAME AND AT LEAST ONE REFERENCE FRAME 202

↓

GENERATE AT LEAST ONE CHROMA FRAME TEMPORAL DIFFERENCE MEASURE (CHROMA TDM) THAT IS A DIFFERENCE BETWEEN CHROMA VALUES OF THE CURRENT FRAME AND ONE OF THE REFERENCE FRAMES, AND PERFORMED TO DETECT MOTION OF IMAGE CONTENT FROM FRAME TO FRAME 204

↓

GENERATE AT LEAST ONE LUMA TEMPORAL DIFFERENCE MEASURE (LUMA TDM) THAT IS A DIFFERENCE BETWEEN LUMA VALUES OF THE CURRENT FRAME AND THE ONE REFERENCE FRAME, AND PERFORMED TO DETECT MOTION OF IMAGE CONTENT FROM FRAME TO FRAME 206

↓

DETERMINE A TYPE OF DE-INTERLACING STRATEGY TO APPLY TO AT LEAST ONE PIXEL LOCATION AT LEAST PARTLY DEPENDING ON A SELECTION BETWEEN A VERSION OF THE AT LEAST ONE CHROMA TDM AND A VERSION OF THE LUMA TDM 208

OBTAIN IMAGE DATA OF FIELDS OF A VIDEO SEQUENCE COMPRISING CURRENT FIELDS TO BE DE-INTERLACED INTO A CURRENT FRAME AND AT LEAST ONE REFERENCE FRAME 202

GENERATE AT LEAST ONE CHROMA FRAME TEMPORAL DIFFERENCE MEASURE (CHROMA TDM) THAT IS A DIFFERENCE BETWEEN CHROMA VALUES OF THE CURRENT FRAME AND ONE OF THE REFERENCE FRAMES, AND PERFORMED TO DETECT MOTION OF IMAGE CONTENT FROM FRAME TO FRAME 204

GENERATE AT LEAST ONE LUMA TEMPORAL DIFFERENCE MEASURE (LUMA TDM) THAT IS A DIFFERENCE BETWEEN LUMA VALUES OF THE CURRENT FRAME AND THE ONE REFERENCE FRAME, AND PERFORMED TO DETECT MOTION OF IMAGE CONTENT FROM FRAME TO FRAME 206

DETERMINE A TYPE OF DE-INTERLACING STRATEGY TO APPLY TO AT LEAST ONE PIXEL LOCATION AT LEAST PARTLY DEPENDING ON A SELECTION BETWEEN A VERSION OF THE AT LEAST ONE CHROMA TDM AND A VERSION OF THE LUMA TDM 208

OBTAIN IMAGE DATA OF FIELDS OF A VIDEO SEQUENCE COMPRISING CURRENT FIELDS TO BE DE-INTERLACED INTO A CURRENT FRAME 252

GENERATE AT LEAST ONE FIELD TEMPORAL DIFFERENCE VALUE (FIELD TDM) OF LUMA PIXEL VALUES FROM DIFFERENT FIELDS EACH HAVING DIFFERENT PIXEL LINE LOCATIONS IN A FRAME THAN THE OTHER FIELD 254

DETERMINE WHETHER A PIXEL LOCATION INDICATES HARMONIC MOTION AT LEAST PARTLY DEPENDING ON THE FIELD TDM VALUE 256

DE-INTERLACE THE FIELDS BY SELECTING AN INTERPOLATION STRATEGY TO BE APPLIED TO THE PIXEL LOCATION AT LEAST PARTLY DEPENDING ON THE DETERMINATION OF HARMONIC MOTION 258

FIG. 5
500
| a1 | b1 | c1 | d1 | e1 |
|----|----|----|----|----|
| a2 | b2 | c2 | d2 | e2 |
| a3 | b3 | (0, 0) c3 | d3 | e3 |
| a4 | b4 | c4 | d4 | e4 |
| a5 | b5 | c5 | d5 | e5 |
FIG. 6
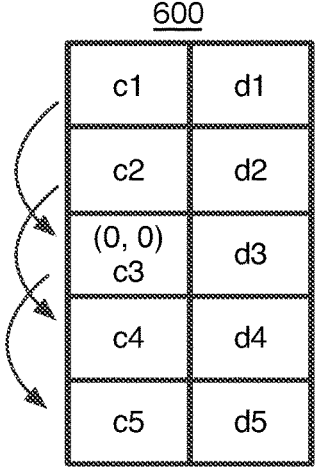
600
| c1 | d1 |
|----|----|
| c2 | d2 |
| (0, 0) c3 | d3 |
| c4 | d4 |
| c5 | d5 |
FIG. 7
700
| b2 | c2 | d2 |
|----|----|----|
| b3 | (0, 0) c3 | d3 |
| b4 | c4 | d4 |

900

| b1 | c1 | d1 | e1 |
|----|----|----|----|
| b2 | c2 | d2 | e2 |
| b3 | (0,0) c3 | d3 | e3 |
| b4 | c4 | d4 | e4 |
| b5 | c5 | d5 | e5 |
| b6 | c6 | d6 | e6 |

920

| b1 | (x, y+2) c1 | d1 | e1 |
|----|----|----|----|
| b2 | c2 | d2 | e2 |
| b3 | (x, y) c3 | d3 | (x+2, y) e3 |
| b4 | c4 | d4 | e4 |
| b5 | (x, y-2) c5 | d5 | e5 |

960

| (x, y+2) c1 | d1 |
|----|----|
| c2 | d2 |
| (x, y) c3 | d3 |
| c4 | d4 |

980

| b1 | (x, y+2) c1 |
|----|----|
| b2 | c2 |
| b3 | (x, y) c3 |
| b4 | c4 |

940

| (x-1,y) | (x,y) | (x+1,y) |
|----|----|----|
| (x-1,y-1) | (x,y-1) | (x+1,y-1) |

1100 FIG. 11

For each window, set edge counters for window of current pixel (x,y): (1102)

- Set Average value of window 1104
- Set Current field High/Low counters 1106
  - Incease Cur High Counter for each pixel in window larger than average 1108
  - Incease Cur Low Counter for each pixel in window smaller than average 1110
- Set Different field High/Low counters 1112
  - Incease DIff High Counter for each pixel in window larger than average 1114
  - Incease Diff Low Counter for each pixel in window smaller than average 1116
- Increase Inliner_Counter for each difference between a pixel and average that is greater than threshold TH_Inliner 1118

Inliner_Counter > TH_Num_Inliner_num/ TH_Num_Inliner_den 1120
- NO → Set bool_HV_Edge as true 1122
- YES ↓

Min(Cur_high, Cur_low) ≥ 1? OR Min(Diff_high, Diff_low) ≥ 1  1124
- NO → Set bool_HV_Edge as true 1122
- YES → Set bool_HV_Edge as false 1126

METHOD AND SYSTEM OF DE-INTERLACING FOR IMAGE PROCESSING

BACKGROUND

Older cathode-ray-tube (CRT) televisions display interlaced frame sequences where each pair of consecutive frames display every other line of image data in a frame. For example, one frame (referred to as a field) may display the even lines or rows of an image, and the next field displays the odd rows. Interlaced video is captured or generated at a higher frame rate than the normal frame rate in order to have the two fields, each captured at a different time in sequence, to form a single frame's worth of image data. This format enhances motion perception and reduces flicker.

On the other hand, more modern televisions and computer-based display devices use progressive video which displays all of the rows of a frame when displaying a single frame. When one of the modern display devices receives an interlaced video sequence of frames (or fields), these fields must be de-interlaced so that each resulting whole frame has image data for all lines in the image. A number of de-interlacing techniques are used such as field combination techniques and/or field extension techniques. Field combination techniques include weaving that simply combines the image data of different rows of two consecutive fields together to form a single frame, and/or blending that combines the data from multiple fields such as by averaging. Field extension techniques form a full frame from a single field of data by interpolation or by simply doubling the data of the alternating rows of a single field, referred to as bobbing. Any of these techniques may be used alone or combined.

Difficulties arise because objects in an image can move from one field to the next field resulting in artifacts visible to a viewer called combing where the content does not appear to be smooth and consistent from line to line, thereby lowering the quality of the displayed images. Thus, motion detection techniques may be used to determine whether image data at a pixel location has moved from one field to another, and when motion is detected, certain temporal-based de-interlacing techniques may be applied to such pixel regions with motion to reduce the artifacts. The conventional motion detection techniques, however, have either been inadequate, often resulting in further visible artifacts that lower the quality of the images especially at a scene change frame or frames with a repeating pattern.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate the corresponding or analogous elements. In the figures:

FIG. 2A is flow chart of a method of de-interlacing for image processing according to at least one of the implementations herein;

FIG. 2B is a flow chart of another method of de-interlacing for image processing according to at least one of the implementations herein;

FIGS. 5-7 are schematic diagrams of pixel regions to explain pixel data differences for chroma motion computations according to the method of FIG. 4;

FIG. 11 is a flow chart of a method of detecting an edge of an object in image content for a method of de-interlacing according to at least one of the implementations herein;

DETAILED DESCRIPTION

Figure 1:
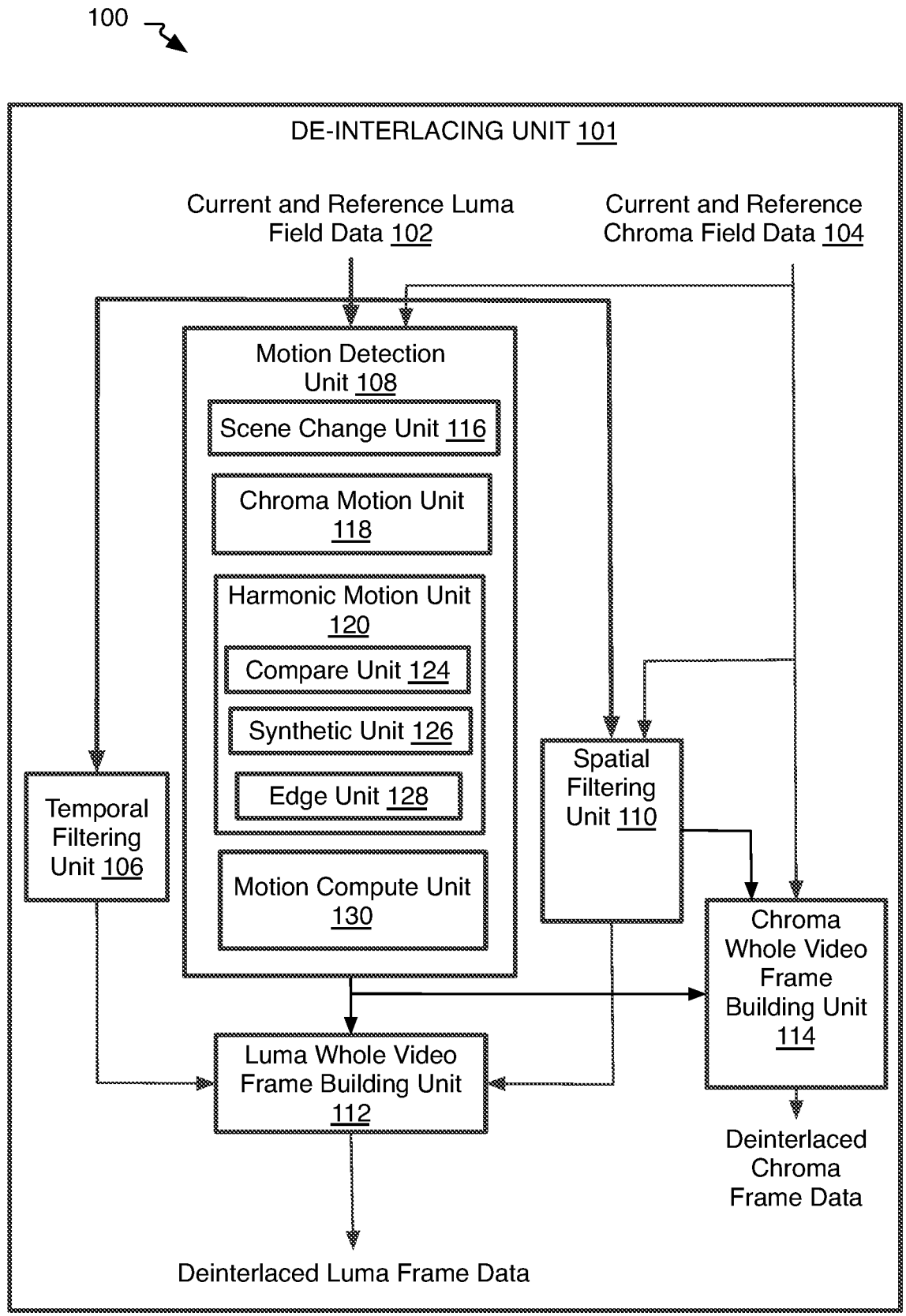
FIG. 1 is a schematic diagram of an image processing system with a de-interlacing unit to perform a method of de-interlacing for image processing according to at least one of the implementations herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes unless specifically specified herein. For instance, various architectures employing, for example, multiple integrated circuit (IC) chips and/or packages, and/or various computing devices, commercial electronic, and/or consumer electronic (CE) devices such as computers, servers, set top boxes, smart phones, smart watches, smart glasses, televisions, monitors, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein also may be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods are described below related to de-interlacing for image processing.

As mentioned, de-interlacing involves combining fields that form a single frame of a video sequence. Typically interlaced fields include a top field and a bottom filed that are combined to form a single frame. The top field starts with the top most row and includes alternating odd rows of a frame going down the frame, while the bottom field starts with the second top row and alternates rows going downward including the evenly numbered rows, often including the bottom most row when an even number of rows forms a frame.

Also as mentioned, motion detection may be used during de-interlacing of interlaced video sequences, but the conventional motion detection techniques often have proven inadequate resulting in a number of artifacts. Once such artifact is harmonic motion where the same color (or more particularly chroma pixel values) appear at the same pixel location from frame to frame but may be different parts of a single moving object or different parts entirely that have moved from frame to frame. In other words, assume an object in image content of a frame such as a cloud in a sky has pixel data at a pixel location on a top field of a first frame. The cloud may have the same pixel data at the same pixel location on the top of field of a next frame making it appear as if the cloud was static (did not move) from frame to frame, when in fact the cloud did move, and it only appears this way because the color and brightness of the cloud is so uniform throughout the area of the cloud. Thus, even though an object in an image is moving, the current motion detection detects these pixel locations as being static because small pixel windows are often used to detect motion from a window on one frame to a matching window on another frame, thereby missing details of moving pixel data. Since the pixel location or region is determined to be static, temporal information is used to generate the missing pixel data between rows in the field so that image data from a previous reference frame may be used and which may miss detail of correct colors caused by image content motion that is nearby a harmonic pixel. Thus, the resulting harmonic motion artifacts can have noticeable incorrect colors nearby a harmonic pixel.

Another artifact is caused by chroma motion of content in an image that can be separate from luma motion, and is referred to herein as chroma motion artifacts. While natural scenes captured by a camera very rarely have different motion between luma and chroma pixel data, in synthetic scenes or images, originating from a computer rather than a camera capture, graphic content can have such separation of chroma and luma motion. Such synthetic scenes may include computer office or work spaces such as word processors, web sites, and so forth, and other computer originated images such as computer games, animation, visual art, and so forth. In the conventional methodology, the de-interlacing module only detects luma motion, and chroma motion is established by using the detected motion information of the luma data. This method also can result in visible artifacts showing distorted colors and illogical brightness and shadows on an image. It should be noted that the term luma herein generally refers to pixel values of brightness rather than color, and may include any form of luma or luminance units.

Other artifacts result when a scene change occurs when image content does not match from one frame that is an end of a scene to a next frame that is a start of a new scene. In this case, the conventional de-interlacing module may attempt to apply temporal motion detection-based interpolation or other techniques relying on the temporal information or image data from a previous reference frame of the prior scene. This can result in large artifacts when the temporal image data is used to generate the missing rows of pixel data on a field, which results in the wrong colors and brightness being inserted into the field of the next frame.

To resolve these issues, the present method and system provides an efficient and accurate method and system of de-interlacing that reduces the scene change artifacts, chroma motion artifacts, and harmonic motion artifacts thereby substantially increasing the quality of the displayed de-interlaced images and the satisfaction of a viewer.

To avoid scene change artifacts, motion detection operations use spatial pixel data of pixels on a same field and without using temporal motion detection data upon a scene change detection. The temporal information may be discarded or ignored if already generated, thereby avoiding generation of the wrong colors and/or brightness in a next start frame of a new scene, and in turn, frames that use the start frame as a reference.

To avoid artifacts caused by chroma motion, temporal differences in chroma pixel data from frame to frame is computed in addition to the temporal luma differences from frame to frame. It has been found that the difference in chroma data can be more sensitive to motion than the difference in luma data. By one example, the difference of the chroma data is compared to a threshold, which indicates the complexity of the motion of the chroma data. Then, the chroma data difference is compared to the luma temporal difference, which indicates whether the chroma motion is significantly different than the luma motion. By one form, the largest temporal difference between the luma and chroma differences is selected as the representative temporal difference measure (TDM) for a specific pixel location or region.

The representative temporal difference measure is then provided for harmonic motion detection. It has been found that while a pixel location may be the same on the same field from one frame to the next (such as on a first or top field on a previous frame and a first or top field on a next frame), there is often detectable motion in the pixel data from one (top) field to the other (bottom) field of the same frame. Thus, while the jump from the first field of the previous frame to the first field of the next frame may hide the harmonic motion of the pixel data, the motion from the first field to the second field of the previous frame is detectable. So by one form, a harmonic temporal difference measure may be computed, depending on luma pixel data differences, from field to field of the same frame. This harmonic temporal field to field measure may be compared to a version of the representative temporal difference measure from the chroma motion analysis as well as luma spatial differences of pixel data from the same field, including both vertical and horizontal spatial differences. Horizontal spatial differences may be computed differently depending on whether horizontal adjacent pixel locations have the same luma values, which indicates these pairs have the same color to determine the complexity of the image. If the complexity of the image is high, the harmonic detection may require large temporal difference values to compare to a textureless complexity region on the current frame. A number of these determinations also may be at least partly based on whether a frame, or a thin line (pixel row) pattern, is synthetic or not, and whether or not a pixel location is on an edge of an object of the content of the image or frame. If a frame is synthetic, it may be more difficult to detect harmonic motion since synthetic pixel data patterns may be more unpredictable. If a pixel location is at an edge of an object, the large spatial differences between image data at the edge may make it easier to detect field to field motion, and in turn harmonic motion, especially when the frame is natural (camera originated) rather than synthetic. The term thin line refers to one or very few pixel rows of texture data. It also will be appreciated that the terms frame, image, and picture are used interchangeably herein unless the context explains otherwise. The details are provided as follows.

Referring to FIG. 1, an example image processing device or system 100 has a de-interlacing unit 101. The de-interlacing unit 101 may receive current and reference field data (referred to as luma data) 102 and current and reference chroma field data (referred to as chroma data) 104. This may include pixel level chroma and luma (YUV color space) pixel data whether or not converted from other color spaces, such as RGB, and pre-processed when needed for de-interlacing operations, such as down-sampling either the luma or chroma data or both to reduce the computational load of the de-interlacing. This also may include providing other statistics such as pixel data block averages, pixel data differences, scene change information, or whatever other statistics are needed for the de-interlacing.

The luma pixel data 102 is provided to a temporal filtering unit 106, a motion detection unit 108, and a spatial filtering unit 110. Likewise, the chroma pixel data 104 is provided to the motion detection unit 108 and the spatial filtering unit 110, but also is provided to a whole video frame building unit 114. A luma whole video frame building unit 112 also is provided.

The motion detection unit 108 performs much of the de-interlacing operations disclosed herein to reduce artifacts while determining whether pixel data of a pixel location has moved. Thus, the motion detection unit 108 may have a scene change unit 116 that indicates whether a frame or fields present a scene change, and that only spatial generation of pixel data, such as by interpolation or other techniques, should be used for the building of the whole frame from the fields rather than de-interlacing techniques involving temporal generation of pixel data. A chroma motion unit 118 provides a temporal difference measure (TDM) that is formed by considering whether chroma motion sufficiently corresponds to luma motion (so that the TDM is based on luma data) or that the TDM should be based on chroma data. A harmonic motion unit 120 then computes a harmonic TDM. The harmonic motion unit 120 may have a comparison unit 124 that may compare the harmonic TDM to the TDM from the chroma motion unit 118 and other spatial complexity measures and factors to determine if a pixel location has data resulting from harmonic motion. This also may involve a synthetic unit 126 that determines whether a field, frame, or pixel location is formed from synthetic or natural (camera) origination, and an edge unit 128 that determines whether a pixel location is on an edge of an object on the content of an image, both of which can be used to determine whether a pixel location indicates harmonic motion. When harmonic motion exists, only spatial generation of data is used to de-interlace fields to form a whole frame as well.

Otherwise, a motion compute unit 130 is provided to determine whether pixel locations have pixel data that has moved from frame to frame when the pixel location has been found to be free of detectable harmonic motion. In this case, a spatial-temporal motion measure (STMM) is computed and compared to thresholds to determine if sufficient motion exists at a pixel location. This may involve using the TDM from the chroma motion unit 118. The details for this computation are provided below.

When motion is detected, a luma whole video frame building unit 112 receives both temporal motion-based generated pixel data from a temporal filtering unit 106 that provides data from a reference frame or field, and spatially generated pixel data from a spatial filtering unit 110 to form temporal-spatial blended data to construct a whole frame from two fields. When a scene change or harmonic motion is detected by the motion detection unit 108, only the data from the spatial filtering unit 110 is used and the generation of temporal motion based data is omitted, or if generated, the temporal data is ignored or discarded. If the chroma unit 118 is selected to provide a final TDM value and the TDM is a chroma TDM, the chroma TDM value would be used for luma whole video frame building unit 112 and chroma whole video frame building unit 114. On the other hand, if a luma TDM is used as the final TDM, a luma TDM value would be used for luma whole video frame building unit 112 and chroma whole video frame building unit 114.

Also when the TDM is based on chroma data, the chroma whole video frame building unit 114 will construct full frames based on the chroma spatial data generation and temporal data based on chroma TDM value as well. Otherwise, when the TDM is based on luma data, the chroma whole video frame building unit 114 will match the data generation of the luma data (whether temporal, spatial, or both). The chroma whole video frame building unit 114 also may up-sample the chroma data when needed to form a full frame's worth of chroma image data.

This results in the data of the luma whole video frame building unit 112 and chroma whole video frame building unit 114 providing luma and chroma data of a full non-interlaced video frame that can be used for progressive display and other formats that use the entire non-interlaced frame of data.

Referring now to FIG. 2A, an example process 200 may provide a computer-implemented method of de-interlacing for image processing according to at least one of the implementations herein. In the illustrated implementation, process 200 may include one or more operations, functions or actions as illustrated by one or more of operations 202 to 208 numbered evenly. By way of non-limiting example, process 200 may be described herein with reference to operations discussed with regard to example systems 100, 1200, 1300, or 1400 discussed herein.

Process 200 may include "obtain image data of fields of a video sequence comprising current fields to be de-interlaced into a current frame and at least one reference frame" 202. This may include obtaining fields of a video sequence whether from a camera, transmitted and decoded video, or video from a storage or memory, and in an interlaced format where multiple fields are to be de-interlaced to form a full frame of image data. This also may involve whatever pre-processing of the image data that might be needed to perform the de-interlacing.

Process 200 may include "generate at least one chroma frame temporal difference measure (chroma TDM) that is a difference between chroma values of the current frame and one of the reference frames, and performed to detect motion of image content from frame to frame" 204, where chroma frame TDM refers to temporal chroma differences from frame to frame rather than field to field of the same frame. For this operation, the chroma frame TDM may be a sum of absolute differences (SADs) of the difference of one pixel location on a current frame and a pixel location on a reference frame, and for a region of these pixel locations. The chroma frame TDM may be U chroma values or V chroma values or both, from the YUV color space.

Process 200 may include "generate at least one luma frame temporal difference measure (luma frame TDM) that is a difference between luma values of the current frame and the one reference frame, and performed to detect motion of image content from frame to frame" 206. Likewise, the luma differences from frame to frame also may be computed, and by one form, a SAD designated TDM Y.

Process 200 may include "determine a type of de-interlacing strategy to apply to at least one pixel location at least partly depending on a selection between a version of the at least one chroma TDM and a version of the luma TDM" 208. Specifically, in one form, the maximum between TDM_U and TDM_V is compared to a threshold that indicates the complexity of the chroma motion from frame to frame. If above this threshold, then a representative TDM is the greater of TDM_Y, TDM_U modified by a factor, or TDM_V modified by a factor. If the chroma TDMs are not above the threshold, then the change in chroma is deemed sufficiently close to the change in luma, and TDM_Y is simply used as the representative TDM for chroma and luma motion. Optionally, the complexity of the chroma motion also may be determined by considering spatial (vertical and horizontal) complexity measures that measure the differences, or SADs, of chroma motion on the same field, which are compared to thresholds. Whether the pixel location in question is on a synthetic thin line pattern on the frame also may be a consideration such that if not synthetic, then the chroma differences are more likely to sufficiently correspond to the luma motion. The details are provided below.

Referring now to FIG. 2B, an example process 250 may provide a computer-implemented method of de-interlacing for image processing according to at least one of the implementations herein. In the illustrated implementation, process 250 may include one or more operations, functions or actions as illustrated by one or more of operations 252 to 258 numbered evenly. By way of non-limiting example, process 250 may be described herein with reference to operations discussed with regard to example systems 100, 1200, 1300, or 1400 discussed herein.

Process 250 may include "obtain image data of fields of a video sequence comprising current fields to be de-interlaced into a current frame" 252, and as already described above with process 200.

Process 250 may include "generate at least one field temporal difference value (field TDM) of luma pixel values from different fields each having different pixel line locations in a frame than the other field" 254. Thus, by one form, TDM field (or TDM _H for harmonic) may be a SAD of luma data differences, although chroma could be used, of pixel locations from different fields, such as top and bottom fields of a same frame, and by one form, differences of image data from pixel locations that are one above the other on adjacent rows so that each pixel location is on a row from a different field. It should be noted that luma temporal differences are used to detect motion for harmonic motion detection.

Process 250 may include "determine whether a pixel location indicates harmonic motion at least partly depending on the field TDM value" 256. This may be determined by using a number of different considerations in addition to the TDM_H value. By one form, the TDM_H may be compared to the representative TDM from the chroma motion determination. Additionally, or instead, the TDM_H may be compared to spatial complexity measures or difference values that indicate luma differences from pixel locations on the same single field. By yet other forms, the harmonic motion detection may depend partly on whether a pixel location is in a thin line synthetic pattern as described above, or forms an edge of an object in the image content of a frame or field. By one approach, the spatial difference values may be modified by synthetic harmonic factors or natural harmonic factors for the comparisons to TDM_H. These and other details are explained below.

Process 250 may include "de-interlace the fields by selecting an interpolation strategy to be applied to the pixel location at least partly depending on the determination of harmonic motion" 258. Particularly, where harmonic motion is found at a pixel location, then spatial interpolation may be performed while omitting temporal motion detection interpolation or other such technique since the temporal-based de-interlacing will err in using the data from the reference frame that has pixel data that is the same in color and hides frame to frame motion. The spatial interpolation will be better at determining the correct color from surrounding pixel data. Other details are provided below.

Figure 3:
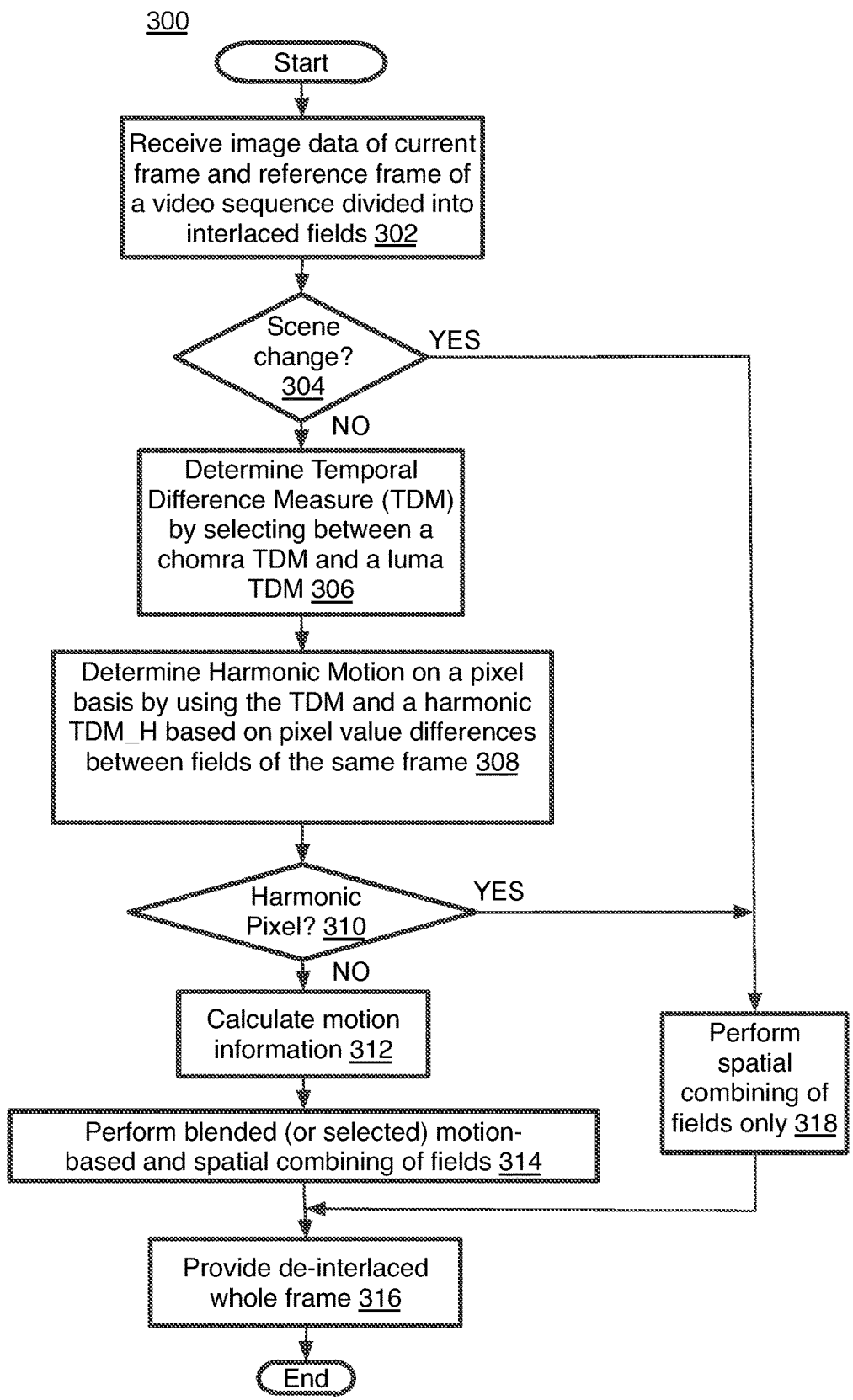
FIG. 3 is a flow chart of a method of de-interlacing for image processing according to at least one of the implementations herein.

Referring to FIG. 3, an example process 300 may provide a computer-implemented method of de-interlacing for image processing according to at least one of the implementations herein. In the illustrated implementation, process 300 may include one or more operations, functions or actions as illustrated by one or more of operations 302 to 318 numbered evenly. By way of non-limiting example, process 300 may be described herein with reference to operations discussed with regard to example systems 100, 1200, 1300, or 1400 discussed herein.

Process 300 may include "receive image data of current frame and reference frame of a video sequence divided into interlaced fields" 302, and as already described above.

Process 300 may include the inquiry "scene change?" 304. For scene change detection, conventional methods may be used that may compare all pixel data of one frame to the pixel data of another frame, or other algorithms such as multi-variable statistical models. This may involve respectively comparing the data of top and bottom fields of a previous frame to top and bottom fields of a next frame.

When a scene change is detected from a previous frame to a current frame for example, the process 300 proceeds with "perform spatial combining of fields only" 318 so that temporal motion detection data is omitted by either avoiding the generation of temporal-based data in the first place, or when the temporal data is generated, by ignoring and/or discarding the temporal-based data. While spatial interpolation is used here, all of the pixels of the frame are still treated as having moving pixel data. Once a scene change is found and spatial interpolation is applied to the current frame, the process 300 obtains the data to analyze the next frame in the video sequence.

When no scene change is detected, or a next frame is being analyzed after the scene change frame, process 300 then may include "determine temporal difference measure (TDM) by selecting between a chroma TDM and a luma TDM" 306, and by one example, the maximum TDM among the luma and chroma TDMs is selected. The TDMs are formed by differencing data of corresponding pixel locations from a previous or reference image and a current image. By one form, the TDM is a SAD of a region of these differences. Optionally, the selection of the TDM also may be at least partly based on spatial differences among the chroma and/or luma data on a same field, and/or whether a pixel location has synthetic rather than natural (or camera) originated data. The selected TDM then may be used to detect harmonic motion as well as a final decision on motion for a pixel location. This selection of the TDM is performed as described in detail below with process 400.

Process 300 then may include "determine harmonic motion on a pixel basis by using the TDM and a harmonic TDM H based on pixel value differences between fields of the same frame" 308. For Harmonic motion detection, the TDM_H is generated by computing a difference between two different fields, and by one form, based on luma data in a region of pixels, and may be a SAD. The TDM_H then may be compared to the TDM and spatial luma complexity measures. Each of the values or parameters compared to the TDM_H may be modified by a factor that is different depending on whether the frame, or data of the pixel location, is synthetic or natural. A synthetic and natural threshold also may be compared to the TDM_H. These comparisons establish a set of synthetic factor conditions and a set of natural factor conditions. Both sets also may require that a pixel location being analyzed is not itself in a thin line synthetic pattern. Also by one approach, the natural factor set is only satisfied when the pixel location being analyzed is at the edge of an object in the image content. If neither set is satisfied, the current pixel being analyzed is not a harmonic motion pixel. If the TDM _H does satisfy either set, then the current pixel can have harmonic motion. One or more harmonic counters are used to track the harmonic motion of individual pixel locations, and if one of the sets is satisfied, and the harmonic count meets a criteria relative to a threshold, such as being less than or greater than a threshold, then the pixel location is considered to have harmonic motion (e.g., its data is moving rather than static).

Thus, process 300 may include the inquiry "harmonic pixel?" 310, and if so, process 300 continues with operation 318 to use spatial interpolation or other spatial technique rather than temporal-based de-interlacing as with the scene change.

When no harmonic motion is found at the pixel location, process 300 may include "calculate motion information" 312. By one example approach, motion detection involves determining a Spatial-Temporal Motion Measure (STMM). STMM is basically equivalent to temporal difference divided by (Horizontal+vertical difference) relative to a pixel location being analyzed. Specifically, this operation involves updating a STMM algorithm in the de-interlacing (DI) motion detection module. STMM is calculated with three differences: temporal difference measure (TDM), spatial horizontal complexity measure (SHCM), and spatial vertical complexity measure (SVCM). The final TDM may be obtained from either the chroma motion operations, or luma motion operations and the SHCM and the SVCM are obtained by using luma data to measure spatial complexity.

By one form, the STMM is then compared to one or more thresholds such as a moving threshold M_TH and a static threshold S_TH. If the STMM is above M_TH, the data of a pixel location is moving and temporal-based de-interlacing to combine fields is used. However, when the STMM is below S_TH, the data of a pixel location is static, and spatial-based data generation is used instead. As another alternative, if M_TH>STMM>S_TH, a blend exists, and a blending technique of spatial and temporal data is used for the de-interlacing. STMM may be smoothed with the STMM saved from the previous filed (STMM_s). By one form, STMM is found by:

$$STMM=(alpha*STMM\_s+(256-alpha)*STMM)/256 \quad (a)$$

where STMM _s is obtained from a memory, and when alpha is set at 255 (U8), then the current STMM is almost the same as STMM_s.

Process 300 may include "perform blended (or selected) motion-based and spatial combining of fields" 314, and based on the comparison of the STMM to thresholds as described.

Process 300 may include "provide de-interlaced whole frame" 316, where the de-interlaced frames are from spatial generation of data (operation 318) or other temporal-based or blended generation from operation 314. The resulting images may be provided for rendering, encoding and transmission, or to other applications or displays that use progressive display and require image data to be provided a whole frame at a time rather than in the interlaced fields.

Figure 4:
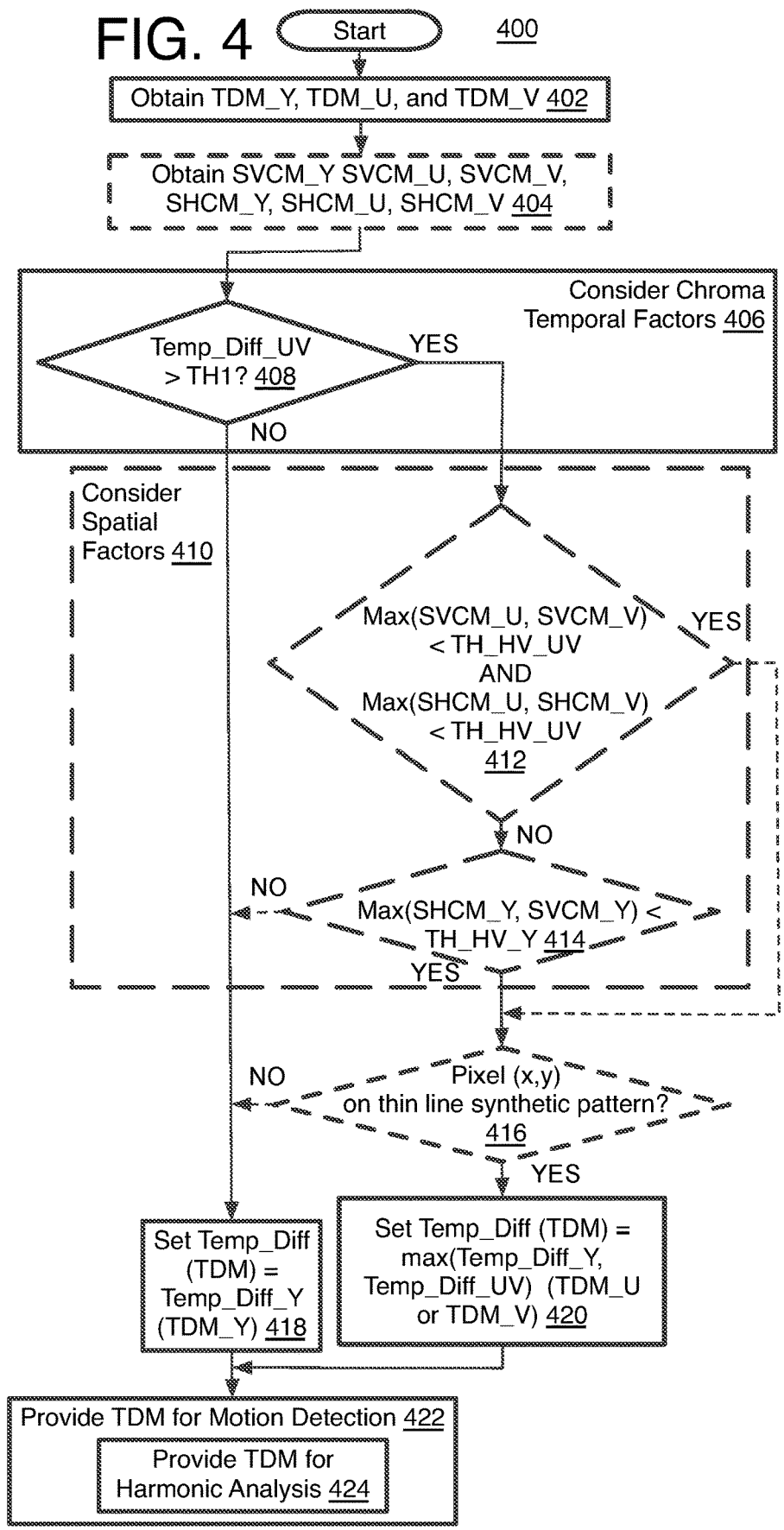
FIG. 4 is a detailed flow chart of a method of determining a temporal difference measure that factors chroma motion for a method of de-interlacing according to at least one of the implementations herein.

Referring to FIG. 4, an example process 400 may provide a computer-implemented method of de-interlacing for image processing according to at least one of the implementations herein, and specifically for forming a temporal difference measure (TDM) that is formed by considering chroma temporal differences. In the illustrated implementation, process 400 may include one or more operations, functions or actions as illustrated by one or more of operations 402 to 424 generally numbered evenly. By way of non-limiting example, process 400 may be described herein with reference to operations discussed with regard to example systems 100, 1200, 1300, or 1400 discussed herein.

When a complex chroma pattern and large chroma temporal difference exists for chroma values, a max TDM value is used among Y/U/V for a representative chroma motion TDM and that is to be used for harmonic motion analysis and may be used for a final motion detection determination when harmonic motion is not present as described below. Otherwise, Luma TDM is used as TDM for a current frame when chroma temporal differences are sufficiently close to, or less than, the luma differences.

To accomplish this, process 400 first may include "obtain TDM_Y, TDM_U, TDM_V" 402, which are all temporal frame to frame differences that may be computed by:

$$TDM\_U = \sum_{x=-1}^{2} \sum_{y=-1}^{2} abs(C_u(x,y) - R_u(x,y)) \quad (1)$$

$$TDM\_V = \sum_{x=-1}^{2} \sum_{y=-1}^{2} abs(C_v(x,y) - R_v(x,y)) \quad (2)$$

TMD _Y (or Temp_Diff_Y) is determined by known equations, but by one example may be computed as:

$$TDM\_Y = \sum_{x=-1}^{2} \sum_{y=-1}^{2} abs(C_y(x,y) - R_y(x,y)) \quad (3)$$

where TDM (or Temp_Diff) is temporal difference measure, $C_y$ is a luma value Y of a pixel, and $C_u$ and $C_v$ are the respective chroma values U and V of a pixel on a current frame, including both top and bottom fields of the current frame. $R_u$, $R_v$, and $R_y$ are the chroma and luma pixel values of the corresponding pixel location on a reference frame also including the top and bottom fields of the reference frame. By one form, the frame immediately before or previous to the current frame is the reference frame but other locations along a video sequence could be selected as the reference frame instead. In this example, the resulting TDM is a sum of absolute difference (SAD) of such current to reference pixel location differences and in regions as set in the equations (1) to (3).

Optionally, spatial considerations may be used to determine the chroma motion TDM as well, and process 400 then may include "obtain SVCM_Y, SVCM_U, SVCM_V, SHCM_Y, SHCM_U, SHCM_V" 404, where:

$$SVCM\_U = \sum_{x=0}^{1} \sum_{x=0}^{2} abs(C_u(x,y) - C_u(x,y-2)) \quad (4)$$

$$SVCM\_V = \sum_{x=0}^{1} \sum_{x=0}^{2} abs(C_v(x,y) - C_v(x,y-2)) \quad (5)$$

$$SHCM\_U = \sum_{x=-1}^{1} \sum_{x=-1}^{1} abs(C_u(x,y) - C_u(x+1,y)) \quad (6)$$

$$SHCM\_V = \sum_{x=-1}^{1} \sum_{x=-1}^{1} abs(C_v(x,y) - C_v(x+1,y)) \quad (7)$$

SVCM_Y and SHCM_Y are obtained by using the same equations except with $C_y$ luma pixel values. Each of these spatial difference values or parameters are a SAD of a region of differences as expressed in the equation.

Referring to FIGS. 5-7, the SAD differences generated by the equations (4) to (7) are basically limited to a region within a 5×5 block of pixels as shown by block 500 where rows are numbered 1 to 5 and columns are labeled 'a' to 'e', and the odd numbered rows are from a top field, and the even numbered rows are on a bottom field. It will be understood the columns could be used instead of rows throughout the de-interlacing process herein.

A pixel region 600 is provided to explain the generation of SVCM_U and SVCM_V (equations (4) and (5)) to show vertical chroma data differences where each difference is between a first pixel location (a1 for example) and a second pixel location (c3 for example) two rows below the first pixel location so that both pixel locations are on the same field. This is repeated and summed for each pixel location where both pixels being differenced are shown on region 600, for six pixel-level differences. It will be understood that different region sizes and shapes could be used instead. It has been found that a six pixel level difference is a good tradeoff between quality and complexity.

A pixel region 700 is provided to explain the generation of SHCM_U and SHCM_V (equations (6) and (7)) to show horizontal chroma data differences where each difference is between a first pixel (b2 for example) and a next pixel to the right along the same row (c2 for example) so that these comparisons or differences are between pixel locations on the same field. This is repeated for two columns in this region for six differences, again however, different region sizes and shapes could be used. Here, a three pixel level difference was found to be a good tradeoff between quality and complexity.

Process 400 may include "consider chroma temporal factors" 406, where at least chroma temporal TDM_U, TDM_V, and TDM_V values are considered to determine chroma motion different than luma motion, and whether or not spatial chroma differences or other factors are being considered. This involves the inquiry "Temp_Diff UV>TH1" 408, where by one example, Temp_Diff_UV is the maximum value of TDM_U and TDM_V. Threshold Th1, also referred to as TH_TDM_UV, sets the distinction between chroma motion that is sufficiently close to luma motion such that a luma TDM adequately represents the chroma motion, and chroma motion that is significantly different than the luma motion. The greater the difference or value of the TDM_U or TDM_V, the more likely chroma motion is different than luma motion, and/or better represented by the TDM_U or TDM_V than the TDM_Y. The threshold TH1 Is determined by experimentation.

When the larger of TDM_U and TDM_V is still smaller than the threshold TH1, then TDM_Y is used as the chroma motion TDM (operation 418). In this latter case, process 400 may include "Set Temp_diff (TDM)=Temp_Diff_Y (TDM_Y)" 418.

When the larger of TDM_U or TDM_V is larger than the threshold TH1, process 400 may continue directly with setting the TDM (also referred to as the Temp_Diff) for chroma motion at operation 420. At this point, the TDM is set (420) as the largest of TDM_Y, TDM_U, and TDM_V.

Otherwise, when the larger of TDM_U or TDM_V is larger than the threshold TH1, process 400 may test other conditions before proceeding to operation 420 to set the TDM. In one case, process 400 optionally then may include "consider spatial factors" 410, which may include the inquiry "max(SVCM_U, SVCM_V)<TH_HV_UV AND max(SHCM_U, SHCM_V)<TH_HV_UV" 412, where threshold TH_HV_UV tends to show that once the temporal chroma differences, and in turn chroma complexity, are shown to be large, then as the spatial chroma differences get smaller from pixel to pixel, it is more likely that the chroma motion is different than luma motion. The threshold here also is set by experimentation and may actually be two different thresholds, one for vertical differences and one for horizontal differences when the two thresholds are not the same value.

Even when the chroma spatial differences are too large to indicate a likely divergence between chroma and luma motion, process 400 may include the inquiry "max (SHCM_Y, SVCM_Y)<TH_HV_Y" 414, to test whether the differences in the luma spatial data itself are sufficiently small to indicate a difference between luma and chroma motion when the chroma temporal differences are large and complex. Again, threshold TH_HV_Y may be determined by experimentation. If the maximum luma spatial complexity measure (SHCM_Y or SVCM_Y) is larger than the threshold, whether or not the chroma spatial measures were larger than their threshold, then divergence is not established, and luma TDM_Y is then TDM for chroma motion.

Another test or comparison that may be performed whether or not the spatial conditions are being used is to include the inquiry "Pixel (x,y) on thin line synthetic pattern?" 416. This tests a value of bool thin synthetic as to whether a data of a pixel location is synthetic (1 or true) or is not synthetic (0 or false). This is determined by process 1000 described below. The concept here is that a synthetic pattern is more likely to have divergence of luma and chroma motion, and therefore TDM is more likely to be TDM_U or TDM_V, especially when the temporal chroma differences are large, and whether or not the spatial differences are considered as well. The chroma motion is more likely to be the same as the luma motion when the frame is not synthetic (bool_thin_synthetic=false) and the image is natural or camera originated.

So when the frame, or thin pixel line, is found to be synthetic if considered, and either the spatial chroma or luma differences are small when considered, as long as the temporal chroma differences are sufficiently large, then process 400 may include "Set Temp_Diff (TDM)=max (Temp_Diff_Y, Temp_Diff_UV) (TDM_U or TDM_V)" 420, where the maximum of TDM_Y, TDM_V, and TDM_U is set as the TDM of chroma motion.

Thereafter, process 400 may include "Provide TDM for Motion Detection" 422, and which may include provide TDM for Harmonic analysis" 424 when being analyzed. Otherwise, the TDM may be provided for STMM computation to make a final motion detection determination as described above with process 300.

The pseudo code for the chroma motion process may be as follows:

```
If:
    (Max(TDM_U, TDM_V) > TH_TDM_UV
    and
        ((Max(SVCM_U, SVCM_V) < TH_HV_U V
        and
        Max(SHCM_U, SHCM_V) < T H_HV_UV )
            or
        Max(SHCM_Y, SVCM_Y) < TH_HV_Y )
    and
    !bool_Thin_Synthetic),
then:
    TDM = Max(TDM_Y, TDM_U*UV_TDM_Factor,
    TDM_V*UV_TDM_Factor)
Else
    TDM = TDM_Y
```

Figure 8A:
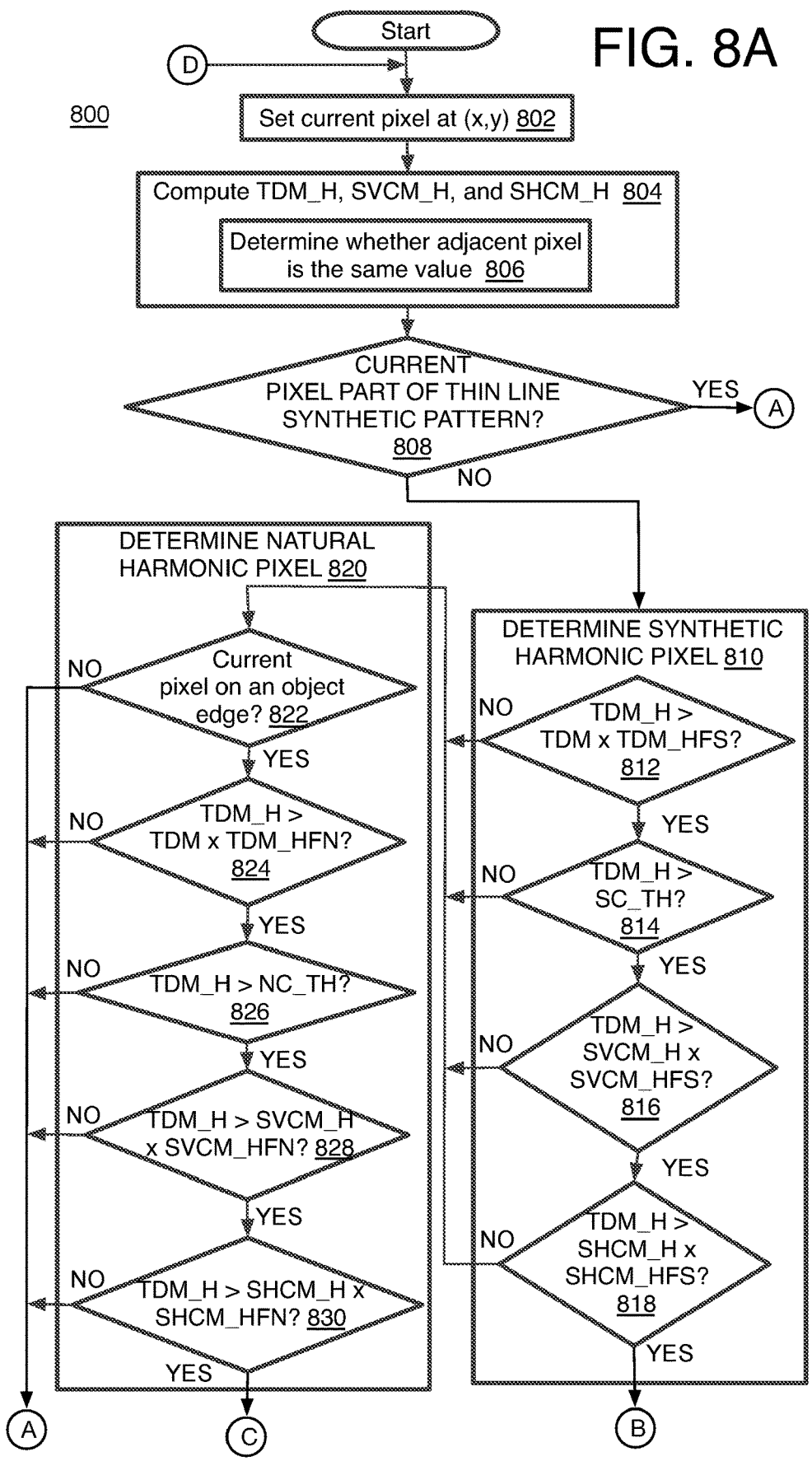
FIGS. 8A-8C is a detailed flow chart of a method of detecting harmonic motion for a method of de-interlacing according to at least one of the implementations herein.
Figure 8B:
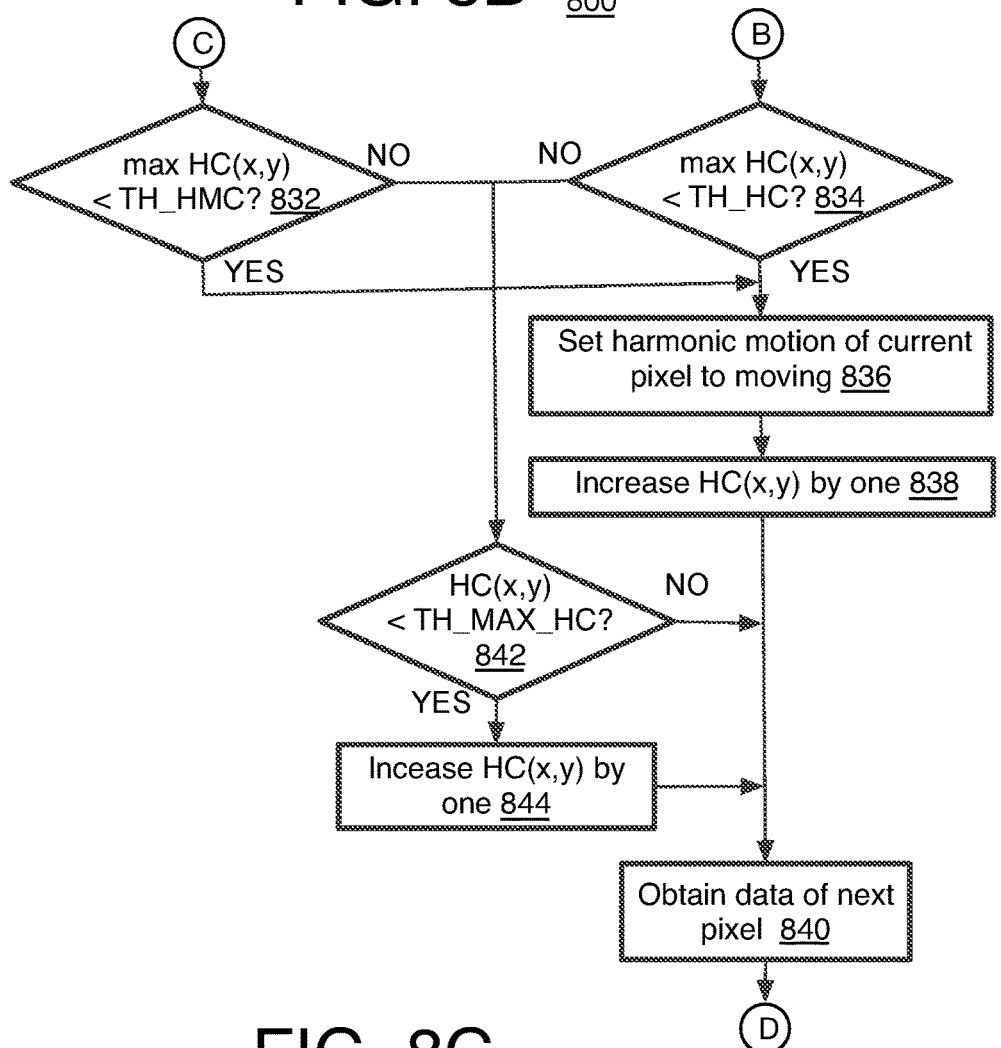
Figure 8C:
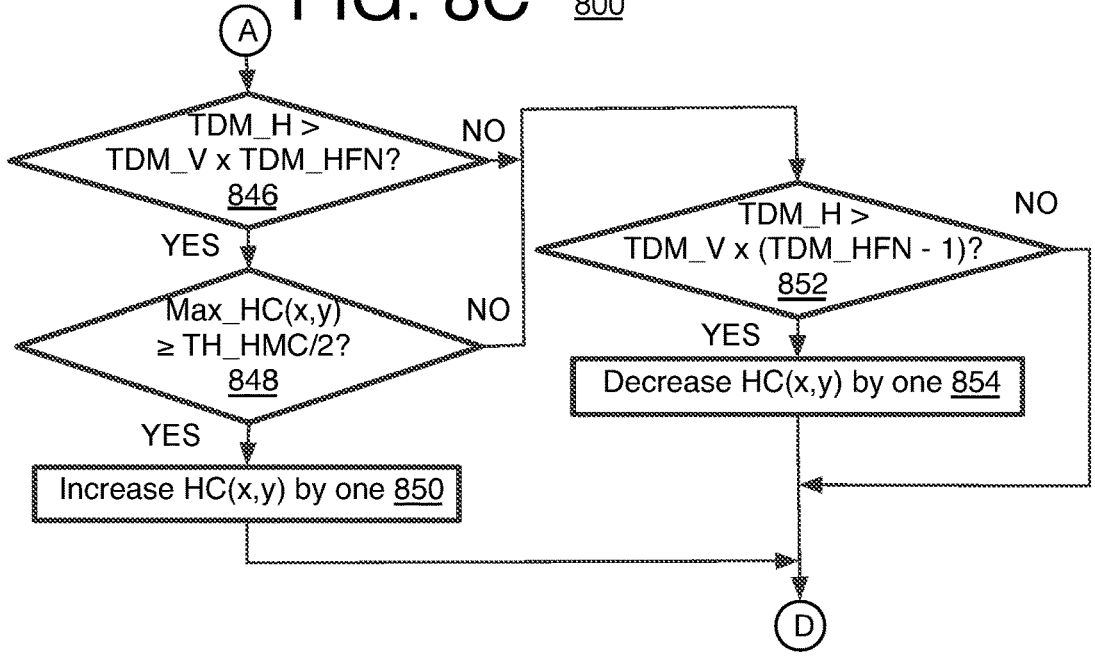

Referring now to FIGS. 8A-8C, an example process 800 is arranged in accordance with at least some implementations of the present disclosure. In general, process 800 may provide a computer-implemented method of de-interlacing for image processing according to at least one of the implementations herein, and particularly to detect harmonic motion of pixel image data. In the illustrated implementation, process 800 may include one or more operations, functions or actions as illustrated by one or more of operations 802 to 854 generally numbered evenly. By way of non-limiting example, process 800 may be described herein with reference to operations discussed with regard to example systems 100, 1200, 1300, or 1400 discussed herein.

Process 800 may include "set current pixel at (x,y)" 802, and so that the following difference or comparison computations are made relative to the current pixel.

Process 800 may include "compute TDM_H, SVCM_H, and SHCM_H" 804, where H stands for harmonic:

$$\text{TDM\_H} = \sum_{x=-1}^{2} \sum_{y=-2}^{2} \text{abs}(C_y(x, y) - C_y(x, y-1)) \quad (8)$$

$$\text{SVCM\_H} = \sum_{x=-1}^{2} \sum_{y=-2}^{0} \text{abs}(C_y(x, y) - C_y(x, y+2)) \quad (9)$$

$$\text{SHCM\_H} = \sum_{y=-1}^{2} \text{abs}(C_y(x', y) - C_y(x'+1, y)) \quad (10)$$

$$\begin{cases} x' = x - 1 \text{ and Left\_Same\_Color} == \text{true} \\ x' = x \text{ and Left\_Same\_Color} == \text{false} \end{cases}$$

Figure 9A:
FIGS. 9A-9E are schematic diagrams of pixel regions to explain pixel data differences for harmonic motion computations according to the method of FIGS. 8A-8C.

Referring to FIG. 9A, TMD_H of equation (8) is based on luma data. A pixel region 900 may be used to generate TDM_H and has an area of five rows 1 to 4 by four columns 'b' to 'e' and showing (0,0) location at c3 for this example. TMD_H is a SAD formed by differencing the luma data of one pixel location and the immediately lower adjacent pixel location on a next row in the frame so that each pair of lower and upper pixels being compared or differenced are from two different fields. This is repeated throughout region 900 to generate 20 comparisons that are summed, although other region sizes, shapes, and number of pixel differences could be used. As mentioned, the consideration of differences from field to field may better capture image content motion when the motion from frame to frame is undetectable because the color and/or brightness does not change from frame to frame at a specific pixel location even though an object in the image has moved.

Figure 9B:

Referring to FIG. 9B, the TMD_H may be compared to a number of other parameter values such as a harmonic spatial vertical complexity measure (SVCM_H) of equation (9), and also based on luma data. A pixel region 920 is provided to show that equation (9) differences luma data between a first pixel location and a second pixel location two rows above the first pixel location and on the same column. This provides a difference in the same field, and is therefore a spatial difference. This is repeated throughout a 4×4 pixel region for 12 differences to form the SAD of SVCM_H, although other arrangements could be used.

Referring to equation (10), a harmonic spatial horizontal complexity measure (SHCM_H) based on luma data is generated differently depending on whether a local region around a current pixel location has two consecutive or adjacent pixel pair locations on the same row that have a similar luma value, and as explained above, to test the complexity of the frame to know when smaller differences are adequate for the harmonic motion detection.

Figure 9D:
Figure 9E:
Figure 9C:

Referring to FIG. 9C, to determine whether two adjacent pixel locations have the same color, process 800 may include "determine whether adjacent pixel is the same value" 806, and by one form, on the same field and in the same row, here referred to as a left pixel relative to a current pixel and referred to as Left Same Color determined as follows:

```
If (max (abs (C_y(x,y - 1) - C_y(x + 1, y - 1)), abs (C_y(x,y) -
    C_y(x + 1, y))) > max (abs (C_y(x,y - 1) - C_y(x - 1, y - 1)), abs
    (C_y(x, y) - C_y(x - 1,y)))),
    Then
        Left_same_color = True
    Else
        Left_same_color = False  (11)
``` where a pixel region 940 shows that equation (11) first determines four differences in luma data including between the current pixel and the pixel to the left, the current pixel and the pixel to the right, and the same two differences in the row below the current pixel. Then the maximum value of the two differences to the right is compared to the maximum of the two differences to the left. When the left comparison value is greater than the right comparison value, this is considered to establish that the left pixel has the same color (Left$_{Same_{Color}}$ is true). If not, the left pixel is not the same color, and Left$_{Same_{Color}}$ is false. Even though equation (11) establishes that adjacent pixel pair locations are the same color, luma data is used rather chroma data to reduce computational load.

Returning to equation (10) and referring to FIGS. 9D-9E, once the left same color parameter is established, x' in equation (10) can be set as recited above where x'=x when the left pixel is not the same (Left$_{Same_{Color}}$ false), but where x'=x−1 when the Left$_{Same_{Color}}$ is true. When Left$_{Same_{Color}}$ is false, a region 960 shows that equation (10) differences luma data between a column with the current pixel and a pixel to the right of the current location column, and individually for each row to form four differences. Alternatively, when Left$_{Same_{Color}}$ true, a region 980 shows that equation (10) differences luma data from a column with the current pixel and from a column to the left of the current location column, and individually for each row to form four differences as well. This difference in columns is used to measure horizontal complexity. The differences are summed to form a SAD establishing SHCM_H, for a single field, and therefore, spatially.

In order to determine whether pixel data at a particular pixel location has moving data (or harmonic motion), the HMD_H must meet a number of conditions or criteria, and this includes applying different conditions depending on whether or not the current pixel location being analyzed is on a thin line synthetic pattern. Thus, process 800 may present the inquiry "current pixel part of thin line synthetic pattern?" 808, and this is mainly determined by comparing fields of previous and current frames to each other and is established by process 1000 (FIG. 10) described below. If the pixel location is found to be on a thin line synthetic pattern, no harmonic motion can be found at the pixel location, and the process 800 continues to maintain a harmonic count at operations 846 to 854 (FIG. 8C) described below, and continues the process 800 with a next pixel location.

When it is determined that the current pixel location being analyzed is not on a thin line synthetic pattern, the TMD _H may be compared to various criteria values or parameters to determine whether a set of conditions are satisfied. One set is referred to as a synthetic factor set where a temporal value (the TDM from the chroma motion analysis (process 400)) as well as the harmonic spatial motion values (SVCM_H and SHCM_H from equations (9) and (10) above respectively) are separately compared to the TDM_H value except that the temporal and/or spatial values are modified by a synthetic frame factor. This set of conditions also may include comparing the TDM_H to a synthetic threshold alone. These synthetic factor conditions are tested even though the pixel location has been found to be clear of a thin line synthetic pattern because the frame as a whole may still have portions that could generally be considered synthetic such that the frame may be considered a synthetic frame, and therefore, the first (synthetic parameter set) has stricter conditions to determine harmonic motion with a more complex image. The second parameter (natural) set is generally less strict, although it has an HV_Edge indicator. The thin_synthetic (or thin line synthetic pattern) designation specifically indicates synthetic versus natural image data at a pixel location.

When one or more the synthetic factor conditions are not met, a second set of conditions may be applied with natural (or camera) originated factors that test for the same type of criteria by separately comparing the TDM_H to TDM, SVCM_H, and SHCM_H, except now by modifying these values with a natural factor. If one or more of these natural factor conditions are not met, then the same further conditions are then applied as if the pixel location being analyzed is on a thin line synthetic pattern, where it is concluded that no harmonic motion exists for the current pixel location but a harmonic motion count for the current pixel location is modified or maintained. The details are as follows.

With regard to the synthetic factor first set of conditions, process 800 may include "determine synthetic harmonic pixel" 810. For this operation, process 800 may include the inquiry "TDM_H>TDM×TDM_HFS?" 812, where the field-based TDM_H is compared to the frame-based TDM. TDM is modified by a TDM harmonic factor synthetic (HFS). TDM_HFS is formed by experimentation.

Process 800 may include the inquiry "TDM_H>SC TH?" 814, where SC_TH is a synthetic content threshold that is formed by experimentation.

Process 800 may include the inquiry "TDM_H>SVCM_H×SVCM_HFS?" 816, where the TDM_H is compared to the SVCM_H modified by a SVCM harmonic factor synthetic (HFS) which modifies the SVCM_H and is formed by experimentation.

Likewise, process 800 may include the inquiry "TDM_H>SHCM_H×SHCM_HFS?" 818, where the TDM_H is compared to the SHCM_H modified by a SHCM harmonic_factor_synthetic (HFS) and is formed by experimentation.

When all four conditions are met for the first set of conditions (the synthetic factor set), process 800 continues with operations 834 to 840 (FIG. 8B) to determine whether the current pixel location has harmonic motion depending on a harmonic motion count for the current pixel location. This is described further below. By another form, not all four conditions need to be met to still find harmonic motion at the pixel location being analyzed.

When any one of these four conditions, or certain ones of the conditions as mentioned, are not met, no harmonic motion is found based on the first set of conditions. Thus, when the conditions are not met for the first set of conditions, then the TDM_H is tested against the second set of conditions with natural factors.

With regard to the natural factor second set of conditions, process 800 may include "determine natural harmonic pixel" 820, and here the comparisons and conditions are the same as in the first set except that a harmonic_factor_natural (HFN) is used instead of synthetic factors, and an additional condition is added regarding whether or not the current pixel location is on or forms an edge of an object in the content of the image. When a pixel is on an object edge, the chroma and luma gradations can be very large so that differences from field to field in gradations can be easier to detect when an edge is moved, and therefore harmonic motion is easier to detect.

Thus, process 800 may include the inquiry "current pixel on an object edge?" 822, and if an edge is not detected, then harmonic motion does not exist (or is not detected), the remaining condition inquiries are skipped, and a harmonic counter is maintained by operations 846-854 (FIG. 8C) before obtaining the data of the next pixel to analyze. When an edge is detected, the process 800 continues with testing of the second set at operation 824. An edge at a pixel location can be detected by determining pixel value differences within a local window near or around the pixel location being analyzed. One example process 1100 (FIG. 11) provides a technique for detecting the edge and is described below.

Process 800 may include the inquiry "TDM_H>TDM× TDM_HFN" 824, and where the TDM harmonic factor natural (TDM_HFN) is determined by experimentation.

Process 800 may include the inquiry "TDM_H>NC_TH?" 826, and where the natural content threshold (NC_TH) is determined by experimentation.

Process 800 may include the inquiry "TDM_H>SVCM_H×SVCM HFN?" 828, and where the SCVM_H harmonic factor natural (SCVM_HFN) is determined by experimentation.

Process 800 may include the inquiry "TDM_H>SHCM_H×SHCM_HFN?" 830, and where the SHVM_H harmonic factor natural (SHVM_HFN) is determined by experimentation.

As with the first set of conditions, when all, or certain ones, of the conditions of the second set are satisfied, process 800 continues with operations 832 to 840 (FIG. 8B) to use a harmonic count to finally determine whether the current pixel location has harmonic motion. Also as with the first set, in some cases, not all four conditions need to be met, and harmonic motion can still be found.

Otherwise, when the second set of conditions are not met, and no harmonic motion is indicated at the current pixel location, the process continues to maintain a harmonic count at operations 846 to 854 (FIG. 8C) described below, and then loops to continue with analysis of a next pixel location at operation 802.

Returning to FIG. 8B, when the conditions are satisfied for the first or second set of conditions, the current pixel location being analyzed is deemed to have moving data or harmonic motion as long as a harmonic count for the pixel location meets a criteria, such as being lower than a threshold. Specifically, process 800 may include the inquiry "max HC(x,y)<TH_HMC?" 832 when the second natural factor set was satisfied, and process 800 may include the inquiry "max HC(x,y)<TH_HC?" 834 when the first synthetic factor set was satisfied. For either set, a Max_Harmonic_Counter (or max HC(x,y)) is a count of the number of previous frames that the current pixel location (x,y) was determined to have harmonic motion (or be a harmonic motion pixel). For the second set, if a pixel was marked as a harmonic motion pixel but max HC(x,y) was larger than a harmonic motion threshold (TH_Harmonic_Motion_Counter or TH_HMC), the pixel is no longer a harmonic pixel and is marked as a general pixel which uses a STMM value for motion detection output.

When the first set is satisfied instead, a different threshold may be used that is a threshold harmonic counter (TH_HC). These two thresholds (TH_HC and TH_HMC) can be the same, but by one form the threshold TH_HMC could be different. Both are determined by experimentation.

Thereafter, the process is the same for both the first and second sets. Particularly, process 800 may include "set harmonic motion of current pixel to moving" 836 when the harmonic counter (max HC(x,y)) is still below the harmonic counter threshold just used. Thus, if satisfied, the pixel is set as a harmonic motion pixel and spatial interpolation or other de-interlacing strategy may be used for harmonic motion pixels as described with operations 310 and 318 of process 300.

Process 800 then may include "increase HC(x,y) by one" 838 to increase the harmonic count of the current pixel to account for the new harmonic motion determination. Process 800 then may include "obtain data of next pixel" 840, and the process loops back to operation 802 to begin analysis of the next pixel location.

Otherwise, when the count max HC(x,y) is above the threshold for a pixel location that satisfied either the first set or second set, the pixel is not considered to have harmonic motion, and usual motion detection is applied to form an STMM as mentioned above and also as described in process 300. In this case, process 800 still may continue to maintain the harmonic motion count for the pixel location. Thus, process 800 may include the inquiry "HC(x,y) <TH_MAX_HC" 842, where a threshold maximum harmonic count is compared to the pixel count HC(x,y). TH_MAX_HC is a maximum count between the previous pixel HC(x−1,y) and co-located pixel (x,y) at the previous frame. HC(x,y) is the harmonic count at (x,y) in the current frame.

When the max harmonic pixel count max HC(x,y) is less than the TH_MAX_HC, then process 800 may include "increase HC(x,y) by one" 844, and still increases the count even though the pixel location is not being considered a harmonic motion pixel for de-interlacing strategy selection for the immediate de-interlacing. This is performed in order to maintain the change in the harmonic motion decision for every frame.

When the conditions of both the first and second sets are not satisfied, or when the current pixel location being analyzed is on a thin line synthetic pattern, the current pixel is not considered a harmonic pixel, the TDM of the pixel may be used to form the STMM as explained above with process 300, and the harmonic count is maintained as follows.

Process 800 may include the inquiry "TDM_H>TDM_V× TDM_HFN?" 846, where the field-based and luma-based TDM_H is compared to the chroma TDM_V (equation (2)) that is modified by TDM_HFN described above with operation 824. If operation 846 is satisfied, process 800 may include the inquiry "Max_HC(x,y)≥TH_HMC/2" 848, and when both of these conditions are met, process 800 may include "increase HC(x,y) by one" 850. Thus, when the field-based TDM_H is greater than the chroma TDM and the harmonic pixel count is greater than half the harmonic maximum count, this indicates this pixel could be a harmonic pixel and the harmonic count can be increased. The process then obtains the next pixel location for analysis and loops back to operation 802.

When either of these conditions are not satisfied, process 800 may include the inquiry "TDM_H>TDM_V× (TDM_HFN−1)" 852, and when this is satisfied, process 800 may include "decrease HC(x,y) by one" 854. The TDM_V is modified by the HFN factor minus one. This was determined by experimentation. If not satisfied, process 800 simply obtains data of the pixel location and loops to operation 802 to begin analysis of the next pixel location.

To decide whether the current pixel has harmonic motion or not, process 800 is summarized by the following pseudo code:

```
If:
    (TDM_H > TDM × TDM_Harmonic_Factor_Synthetic and
    TDM_H > Synthetic_Content_TH and
    TDM_H > SVCM_H × SVCM_Harmonic_Factor_Synthetic and
    TDM_H > SHCM_H × SHCM_Harmonic_Factor_Synthetic and
    !boolThin_Synthetic),
Then
{
    If (Max_Harmoic_Counter(x,y) < TH_Harmonic_Counter)
    {
        Set Harmonic_Motion (Set the current pixel to moving);
        Increase Harmonic_Counter(x,y) by 1;
    }
    Else
        Increase Harmonic_Counter(x,y) by 1 if Harmonic_Counter(x,y) is less than
        TH_MAX_Harmonic_Counter;
}
Else if:
    (TDM_H > TDM × TDM_Harmonic_Factor_Natural and
    TDM_H > Natural_Content_TH and
    TDM_H > SVCM × SVCM_Harmonic_Factor_Natural and
    TDM_H > SHCM_H × SHCM_Harmonic_Factor_Natural and
    !bool_Thin_Synthetic and
    bool_HV_Edge)
Then
{
    If (Max_Harmonic_Counter(x,y)<TH_Harmonic_Motion_Counter)
    {
        Set Harmonic Motion (Set the current pixel to moving);
        Increase Harmonic_Counter(x,y) by 1;
    }
    Else
        Increase Harmonic_Counter(x,y) by 1 if Harmonic_Counter(x,y) is less than
        TH_MAX_Harmonic_Counter;
}
Else if:
    (TDM_H > TDM_V × TDM_Harmonic_Factor_Natural and
    Max_Harmoic_Counter(x,y) >= TH_Harmonic_Motion_Counter /2),
Then
    Increase Harmonic_Counter(x,y) by 1;
Else if
    ((TDM_H > TDM_V × (TDM_Harmonic_Factor_Natural−1))
    Decrease Harmonic_Counter(x,y) by 1;
```

Figure 10:
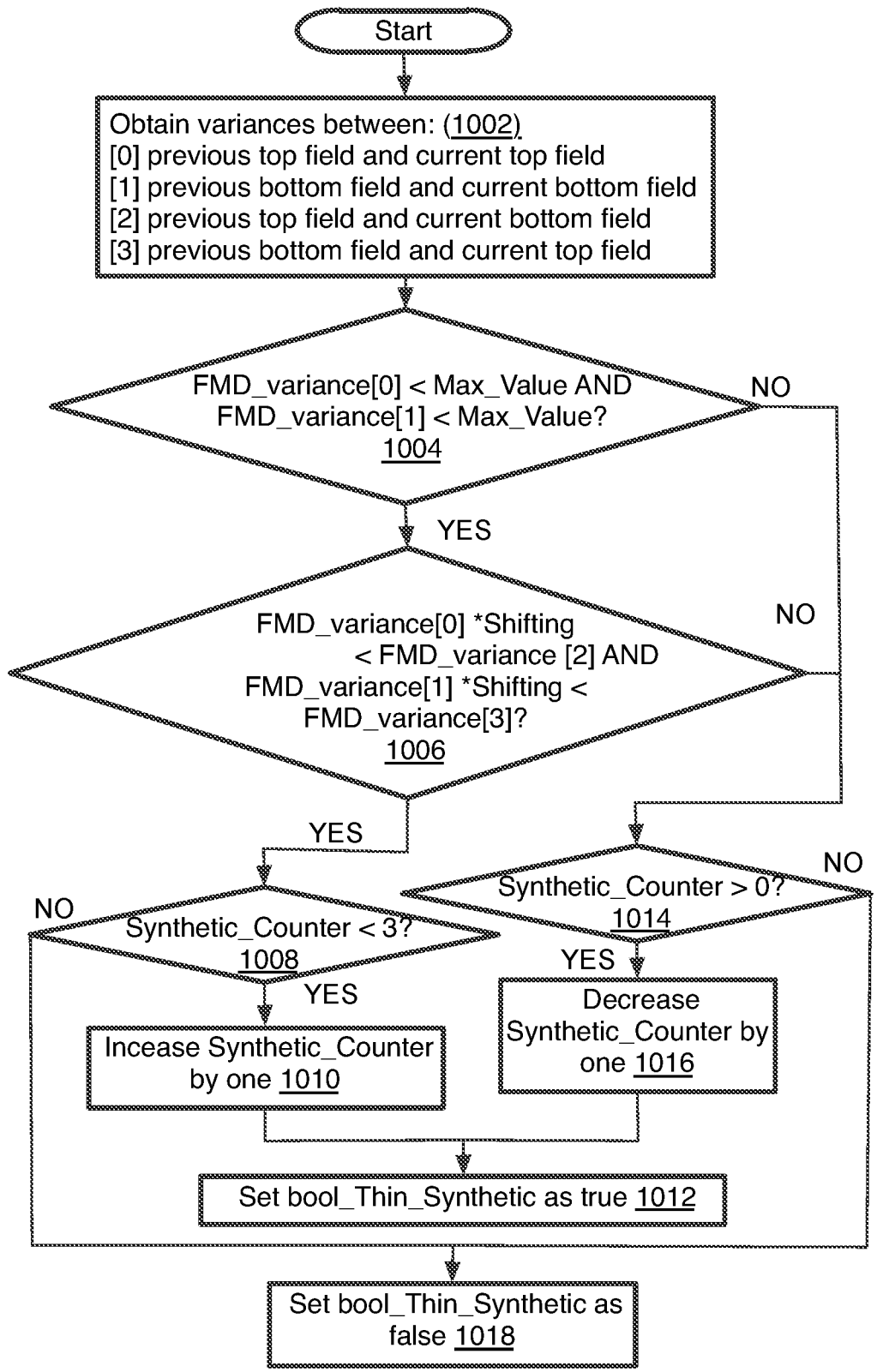
FIG. 10 is a flow chart of a method of detecting a thin line synthetic pattern for a method of de-interlacing according to at least one of the implementations herein.

Referring now to FIG. 10, an example process 1000 is arranged in accordance with at least some implementations of the present disclosure. In general, process 1000 may provide a computer-implemented method of de-interlacing of image processing according to at least one of the implementations herein, and specifically to a method of determining whether a pixel location has synthetic or natural (camera) originated data. In the illustrated implementation, process 1000 may include one or more operations, functions, or actions as illustrated by one or more of operations 1002 to 1018 generally numbered evenly. By way of non-limiting example, process 1000 may be described herein with reference to operations discussed with regard to example systems 100, 1200, 1300, or 1400 discussed herein.

While process 1000 determines a bool_thin_synthetic parameter as being true or false and to indicate whether a single pixel location is on a thin line synthetic pattern in a frame that could have a mix of synthetic and naturally originating data, process 1000 actually finds that an entire frame should be considered synthetic or not, and therefore any line on the frame also is considered synthetic.

Process 1000 may include "obtain variances between:
    [0] previous top field and current top field
    [1] previous bottom field and current bottom field
    [2] previous top field and current bottom field
    [3] previous bottom field and current top field" 1002,
where top and bottom fields are as described above, and the variance refers to the SAD of all pixel data of a field, such as all luma, chroma U, or chroma V data.

Process 1000 may include the inquiry "FMD_variance[0] <Max_Value AND FMD_variance[1]<Max_Value?" 1004, where FMD stands for film mode detection, and Max_Value is a threshold determined by experimentation and indicates an object on the frame is more likely to be a thin object when very large variances exist from frame to frame. If the two conditions are not satisfied and it is more likely a frame is natural, then process 800 continues with the inquiry "synthetic_counter>0?" 1014. The synthetic_counter is a count of the number of consecutive frames that have been deemed to be synthetic and starts with a value of zero. If the counter is greater than zero thereby indicating a sequence of synthetic frames have been detected until now, then process 1000 may include "decrease synthetic_counter by one" 1016, but still include "set bool_thin_synthetic as true" 1012 thereby recognizing the present frame as a synthetic frame anyway to prevent frequent changes between frames.

If the synthetic_counter is zero, then process 1000 may include "set bool_thin_synthetic as false" 1018. The bool_thin_synthetic value is set as false on the first frame as a default.

Returning to the two variance conditions of operation 1004, and when both conditions are satisfied such that both FMD_variance[0] and FMD_variance[1] are below Max value, then process 1000 may provide another couple of conditions. These conditions compare shifted frame to frame variance[0] and variance[1] respectively to cross-field (for example top to bottom field or vice versa) frame to frame FMD_variance[2] and FMD_variance [3]. When the cross-field variances are sufficiently greater than the frame to frame differences, this indicates that the frame is more likely to be synthetic because a thin object should have small differences at the co-located pixel between the previous and current frame, and large difference between pixels at a different line. For this operation then, Process 1000 may include the inquiry "FMD_variance[0] * Shifting<FMD_variance[2] AND FMD_variance[1] *Shifting FMD_variance[3]" 1006, where Shifting refers to five bits shift right to multiply the FMD_variance[0] by 32, and this is performed to compare an amount of the differences between co-located pixels and different line pixels.

When the two conditions with the cross-field variances are not satisfied in operation 1006, process 1000 proceeds with operation 1014 and depending on whether the synthetic_counter is zero as already described above for operation 1004.

If the two cross-field variance conditions are satisfied with operation 1006, then process 1000 may include the inquiry "synthetic_counter<3" 1008, which could be other values but 3 is used here as a maximum number of allowable consecutive synthetic frames to prevent different inconsistent decisions between single frames. When the synthetic counter is less than 3, process 1000 may include "increase synthetic_counter by one" 1010, and then "set bool_t hin_synthetic as true" 1012 thereby establishing that the current frame is synthetic. If the synthetic counter is greater than 3, then process 1000 may include "set bool_thin_synthetic as false" 1018.

Process 1000 used to determine whether a pixel location has data of a thin line synthetic pattern also may be expressed by the following pseudo code:

```
If (FMD_Variance[0] < Max_Value && FMD_Variance[1] <
Max_Value)
{
    If (FMD_Variance[0] *Shifting< FMD_Variance[2]&&
    FMD_Variance[1]
    *Shifting< FMD_Variance[3])
    {
        Increase synthetic_Counter by 1 if the counter is smaller
        than 3;
        Set bool_Thin_Synthetic true;
    }
    Else
    {
        Decrease synthetic_Counter by 1 if the counter is larger
        than 0;
        If(synthetic_Counter >0)
            Set bool_Thin_Synthetic true;
        Else
            Set bool_Thin_Synthetic false;
    }
}
Else
{
    Decrease synthetic_Counter by 1 if the counter is larger than 0;
    If(synthetic_Counter >0)
        Set bool_Thin_Synthetic true;
    Else
        Set bool_Thin_Synthetic false;
```

Referring now to FIG. 11, an example process 1100 is arranged in accordance with at least some implementations of the present disclosure. In general, process 1100 may provide a computer-implemented method of de-interlacing of image processing according to at least one of the implementations herein, and specifically to determine if a pixel location forms an edge of an object in the image content. In the illustrated implementation, process 1100 may include one or more operations, functions or actions as illustrated by one or more of operations 1102 to 1126 generally numbered evenly. By way of non-limiting example, process 1100 may be described herein with reference to operations discussed with regard to example systems 100, 1200, 1300, or 1400 discussed herein.

As mentioned above, a determination that a pixel location is at an edge of an object in the image content for operation 822 (FIG. 8) indicates that harmonic motion should be easier to detect because changes in large image data gradations at edges should be easier to detect from field to field even though frame to frame motion may be hidden at the pixel location.

To determine whether a pixel is located at an edge, a bool_HV_Edge parameter is determined as true or false by determining luma pixel data differences within a window (or region or block) of pixels around or nearby a current pixel location being analyzed. The details are as follows.

Process 1100 may include "for each window, set edge counters for window of current pixel(x,y)" 1102. By one form, five edge counters that count pixel data differences within a window around or near a current pixel location are used to determine whether the current pixel is an edge pixel. The counters are updated as follows.

Process 1100 may include "set average value of window" 1104, where a window of luma values are averaged to determine one or more of the edge counts. By one form, a luma average of a 5×5 pixel window is determined, and where the current pixel is the center of the 5×5 window. Since the window includes more than one contiguous row, the window includes three rows from a current field, which includes the center row and current pixel being analyzed, and two rows from a different (or second) field. For pixels at the border of an image where the current pixel cannot be placed at the center of the window, repeat border pixels to make a window.

Process 1100 may include "set current field high/low counters" 1106, and this compares the luma value of each pixel location in the window that is on the same field as the current pixel location being analyzed and compared to the average luma value for the window. For these comparisons, process 1100 may include "increase current high counter for each pixel in window larger than average" 1108, and for an edge counter Cur_High, and process 1100 may include "increase current low counter for each pixel in window smaller than average" 1110, and for an edge counter Cur_Low.

Process 1100 may include "set different field high/low counters" 1112, and this compares the luma value of each pixel location in the window that is on the different field from that of the current pixel location being analyzed and compared to the average luma value for the window. For these operations, process 1100 may include "increase different high counter for each pixel in window larger than average" 1114, and for a Diff High edge counter, and process 1100 may include "increase different low counter for each pixel in window smaller than average" 1116, and for a Diff Low edge counter.

For the fifth edge counter, process 1100 may include "increase Inliner_counter for each difference between a pixel and average that is greater than threshold TH_Iliner" 1118. This inliner counter is increased by one when an absolute difference between a pixel in the 5×5 window and the average value is less than a threshold TH_Inliner, no matter which field the pixel is on. The threshold TH_Inliner indicates whether the pixel is an inline pixel or not, and is determined by experimentation.

Once the five counters are set, process 1100 proceeds to use the counters to determine whether the current pixel is on an edge of an object. Therefore, process 1100 may include the inquiry "Inliner_Counter>TH_Num_inliner_num/TH_num_Inliner_den" 1120, where TH_Num_inliner_num divided by TH_num_Inliner_den generates a threshold TH_Num_Inliner. The threshold TH_Num_inliner_num and the threshold TH_num_inliner_den are determined by experimentation.

When the Inliner_counter is smaller than TH_Num_Inliner, and condition operation 1120 is not satisfied, then process 1000 may include "set bool_HV_edge as true" 1122, thereby establishing the current pixel location is on an edge of an object. This is used to determine the harmonic motion detection at operation 822.

When the Inliner_counter is larger than TH_Num_Inliner, process 1100 may include the inquiry "min(Cur_high, Cur_low)≥1? or min(Diff_high, Diff_low)≥1?" 1124 (or in other words, at least not zero). This tests whether all of the current field pixel values in the window are either uniformly above or below the average value of the window, and/or whether all of the different field pixel values in the window are either uniformly above or below the average value of the window. When such uniformity exists, this tends to establish an edge right along the row lines between the two fields forming a frame. When either of these conditions exist, an edge is considered to be established at the current pixel (1122). When neither condition exists, process 1100 may include "set bool_HV_edge as false" 1126, and no edge is detected at the current pixel.

Pseudo code for edge detecting process 1100 is as follows.

```
Avg = Average in 5×5 window
for (pixels in 5×5 window)
{
        if(Pixel is in the same field of the current pixel)
        {
                if(Pixel is larger than Avg)
                        Increase Cur_High by 1;
                else
                        Increase Cur_Low by 1;
        }
        else
        {
                if(Pixel is larger than Avg)
                        Increase Diff_High by 1;
                else
                        Increase Diff_Low by 1;
        }
        if(Difference between pixel and Avg is less than TH_Inliner)
                Increase Inliner_Counter by 1;
}
if(Inliner_Counter is larger than TH_Num_Inliner_num/
TH_Num_Inliner_den)
{
        if(Minimum between Cur_High and Cur_Low is larger than or
        equal to 1
                ||
        Minimum between Diff_High and Diff_Low is larger than or
        equal to 1)
                HV_Edge = false;
        else
                HV_Edge = true;
}
else
        HV_Edge = true.
```

While implementation of example processes 200, 250, 300, 400, 800, 1000, and/or 1100 may include the undertaking of all operations shown in the order illustrated, the present disclosure is not limited in this regard and, in various examples, implementation of any of the processes herein may include the undertaking of only a subset of the operations shown and/or in a different order than illustrated.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 12:
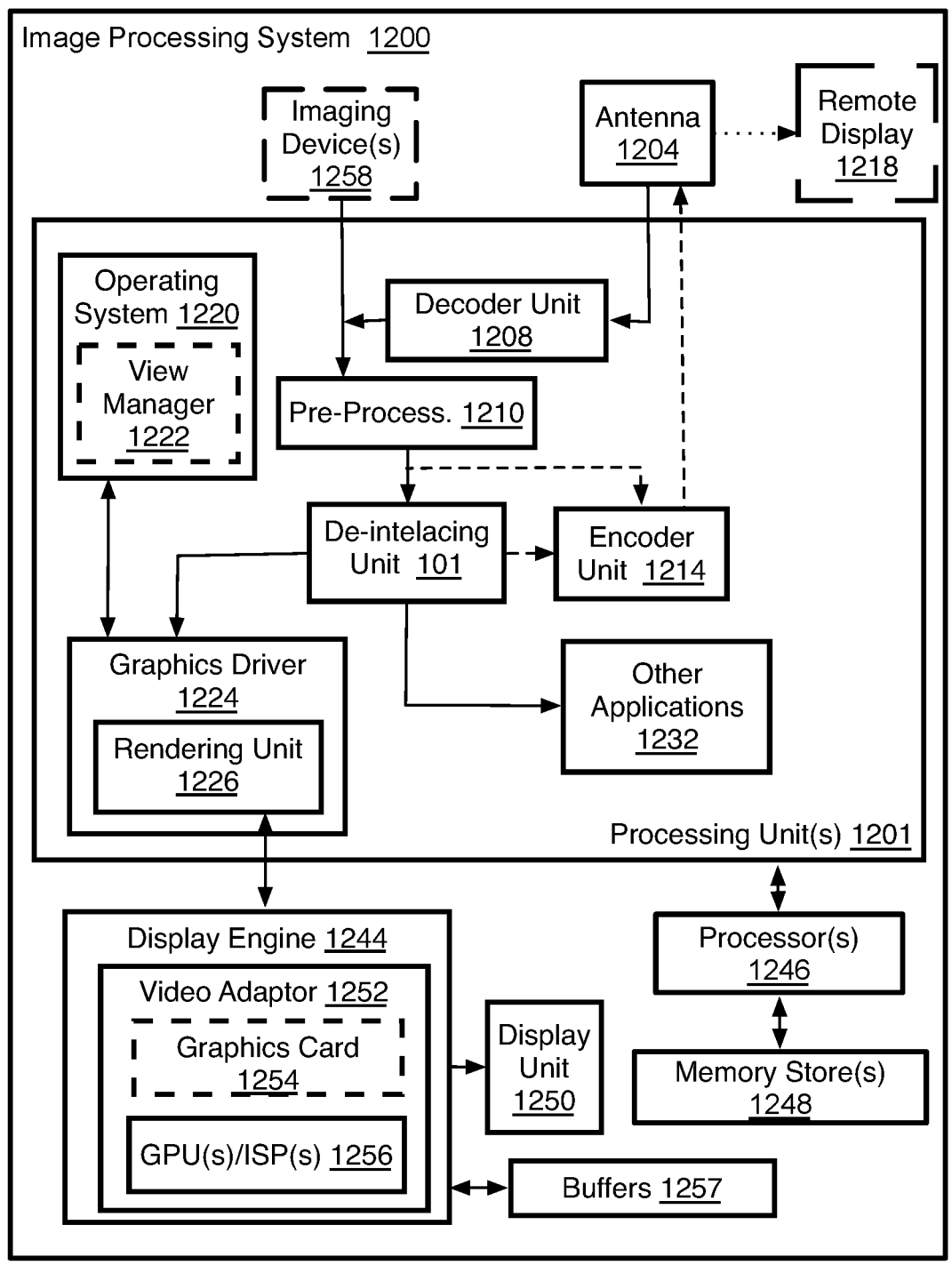
FIG. 12 is an illustrative diagram of an example system for operating a method of de-interlacing according to at least one of the implementations herein.

Referring to FIG. 12, an example image processing system 1200 is used to perform de-interlacing for image processing according to at least one of the implementations herein. The system 1200 may have processing unit(s) 1201 that are logic circuitry or modules to perform the operations described herein. This may include an operating system (OS) 1220 that manages the computer hardware and software, an antenna 1204 that receives input interlaced fields of frames or may transmit de-interlaced frames of image data to a remote display device 1218, a decoder unit 1208 that may decode the input images, a pre-processing unit 1210 that formats the image data for other applications, and image or other applications 1232 that may use the decoded and images for various tasks. An encoder unit 1214 may be provided to encode de-interlaced image data for transmitting the de-interlaced image data via antenna 1204 to the remote display device. Otherwise, for the de-interlacing purposes described herein, de-interlacing unit 101 (FIG. 1) may be provided directly to receive decoded and pre-processed interlaced fields and provide the de-interlaced frames to a graphics driver 1224 for rendering.

The OS 1220 may communicate with, and control, the graphics driver 1224 to have the graphics driver obtain the image data and perform rendering of images by using a display engine 1244. The display engine 1244 may or may not communicate with a display unit 1250 to display the images locally. The graphics driver 1224 may have a rendering unit 1226 to control the display of the images.

Also in the illustrated implementation, system 1200 may include one or more central processing units and/or other types of processors 1246, one or more memory stores 1248 to store applications, image data, and statistics described herein, and optionally one or more imaging devices 1258 to capture images when so provided. The display engine 1244, processor(s) 1246, and memory store 1248 may be capable of communication with one another, via, for example, a bus, wires, or other access.

Now in more detail, the OS 1220 may be many different operating systems and is not limited to any one type of OS as long as it has or communicates with a view manager 1222 such as a desktop windows manager (DWM) or other desktop compositor application for example that communicates between user interfaces, applications that use image data, and so forth to perform rendering by one example and that may or may not be considered a part of the OS, and as long as the OS 1220 or other component communicating with the OS can control the graphics driver as indicated herein. By one possible non-limiting example, the OS 1220 may be Windows OS DirectX Graphics Infrastructure (DXGI). The display engine 1244 may run hardware such as a display driver, video adaptor, or controller 1252 which may be in the form of a graphics card 1254 and/or one or more shared general purpose, or specific fixed function, graphics processing units (GPUs) and/or image signal processors (ISPs) 1256 that may have buffers 1257 that are loaded by the graphics driver 1224, and may or may not be considered as part of memory 1248.

The graphics driver 1224 may retrieve frames from a decoding output buffer for example, or from swap chain buffers, to process the image data for rendering. This may include color space conversions, scaling, image enhancements, blending with other planes, 3D rendering which in one form is performed in order to generate back buffer content as required and that fits the display requirements, buffer flipping, and so forth. When the image processing system has a display 1250, the images may be rendered if desired, where the images are passed to local frame buffers at the display and then displayed.

As will be appreciated, the modules illustrated in FIG. 12 may include a variety of software and/or hardware modules and/or modules that may be implemented via software or hardware or combinations thereof if not already specified. For example, the modules may be implemented as software via processing units 1201 or the modules may be implemented via a dedicated hardware portion. Also, system 1200 may be implemented in a variety of ways. For example, system 1200 may be implemented as a single chip or device having an accelerator or a graphics processor unit (GPU) which may or may not have ISPs, a quad-core central processing unit, and/or a memory controller input/output (I/O) module. In other examples, system 1200 may be implemented as a chipset or a system on a chip (SoC), or any of the other structures mentioned herein.

Otherwise, processor(s) 1246 may include any suitable implementation including, for example, microprocessor(s), multicore processors, application specific integrated circuits, chip(s), chipsets, programmable logic devices, graphics cards, integrated graphics, general purpose graphics processing unit(s), fixed function GPUs, other accelerators, or the like.

In addition, memory stores 1248 and buffers 1257 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1248 also may be implemented via cache memory.

In various implementations, the example video coding system 1200 may use the imaging device 1258 to form or receive captured image data. This can be implemented in various ways. Thus, in one form, the image processing system 1200 may be one or more digital cameras or other image capture devices, and imaging device 1258, in this case, may be the camera hardware and camera sensor software, module, or other components. In other examples, video coding system 1200 may have an imaging device 1258 that includes or may be one or more cameras, and processing units or logic modules 1201 may communicate remotely with, or otherwise may be communicatively coupled to, the imaging device 1258 for further processing of the image data.

Thus, video coding system 1200 may be, or may be part of, or may be in communication with, one or more computers, one or more servers, a smartphone, tablet, laptop, or other mobile device such as wearables including smart glasses, smart headphones, exercise bands, and so forth. In any of these cases, such technology may include a camera such as a digital camera system, a dedicated camera device, or an imaging phone or tablet, whether a still picture or video camera, camera that provides a preview screen, or some combination of these. By other forms, system 1200 may have or be a computer, server, or any other computing device that has the capabilities described herein.

As illustrated, any of these components may be capable of communication with one another and/or communication with portions of logic modules 1201. Thus, processors 1246 and display engine 1244 may be communicatively coupled to the logic modules 1201 for operating those components. Although image processing system 1200, as shown in FIG. 12, may include one particular set of blocks or actions associated with particular components or modules, these blocks or actions may be associated with different components or modules than the particular component or module illustrated here.

Figure 13:
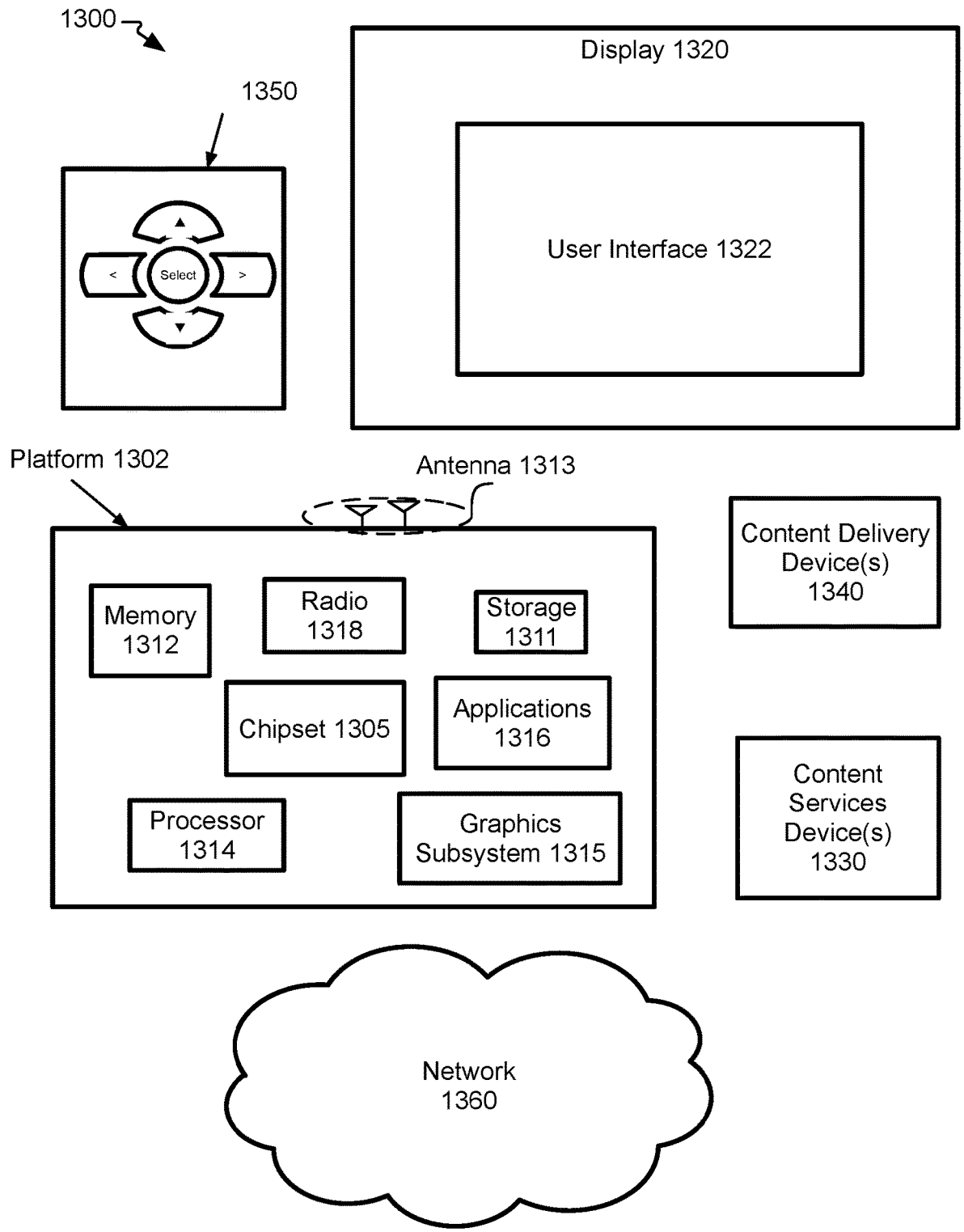
FIG. 13 is an illustrative diagram of another example system.

Referring to FIG. 13, an example system 1300 in accordance with the present disclosure and various implementations may embody system 1300 for example, and may be a media system although system 1300 is not limited to this context. For example, system 1300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1300 includes a platform 1302 communicatively coupled to a display 1320. Platform 1302 may receive content from a content device such as content services device(s) 1330 or content delivery device(s) 1340 or other similar content sources. A navigation controller 1350 including one or more navigation features may be used to interact with, for example, platform 1302 and/or display 1320. Each of these components is described in greater detail below.

In various implementations, platform 1302 may include any combination of a chipset 1305, processor 1314, memory 1312, storage 1311, graphics subsystem 1315, applications 1316 and/or radio 1318 as well as antenna(s) 1310. Chipset 1305 may provide intercommunication among processor 1314, memory 1312, storage 1311, graphics subsystem 1315, applications 1316 and/or radio 1318. For example, chipset 1305 may include a storage adapter (not depicted) capable of providing intercommunication with storage 1311.

Processor 1314 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1314 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1311 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1311 may include technology to increase the storage performance enhanced protection for valuable digital media when multiple hard drives are included, for example.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, Display Port, wireless HDMI, and/or wireless HD compliant techniques. Graphics subsystem 1315 may be integrated into processor 1314 or chipset 1305. In some implementations, graphics subsystem 1315 may be a stand-alone card communicatively coupled to chipset 1305.

The graphics and/or video processing techniques described herein may be implemented in various hardware architectures including fixed function hardware such as video motion estimation (VME) engines or similar parallel processing circuits. For example, graphics and/or video functionality may be integrated within a chipset. Alternatively, a discrete graphics and/or video processor may be used. As still another implementation, the graphics and/or video functions may be provided by a general purpose processor, including a multi-core processor. In other implementations, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of unidirectionally or bidirectionally communicating content between content providers and platform 1302 and/display 1320, via network 1360 or directly. It will be appreciated that the content may be communicated unidirectionally and/or bidirectionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of controller 1350 may be used to interact with user interface 1322, for example. In implementations, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1350 may be replicated on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In implementations, controller 1350 may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 7.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various implementations, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various implementations, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 13.

Figure 14:
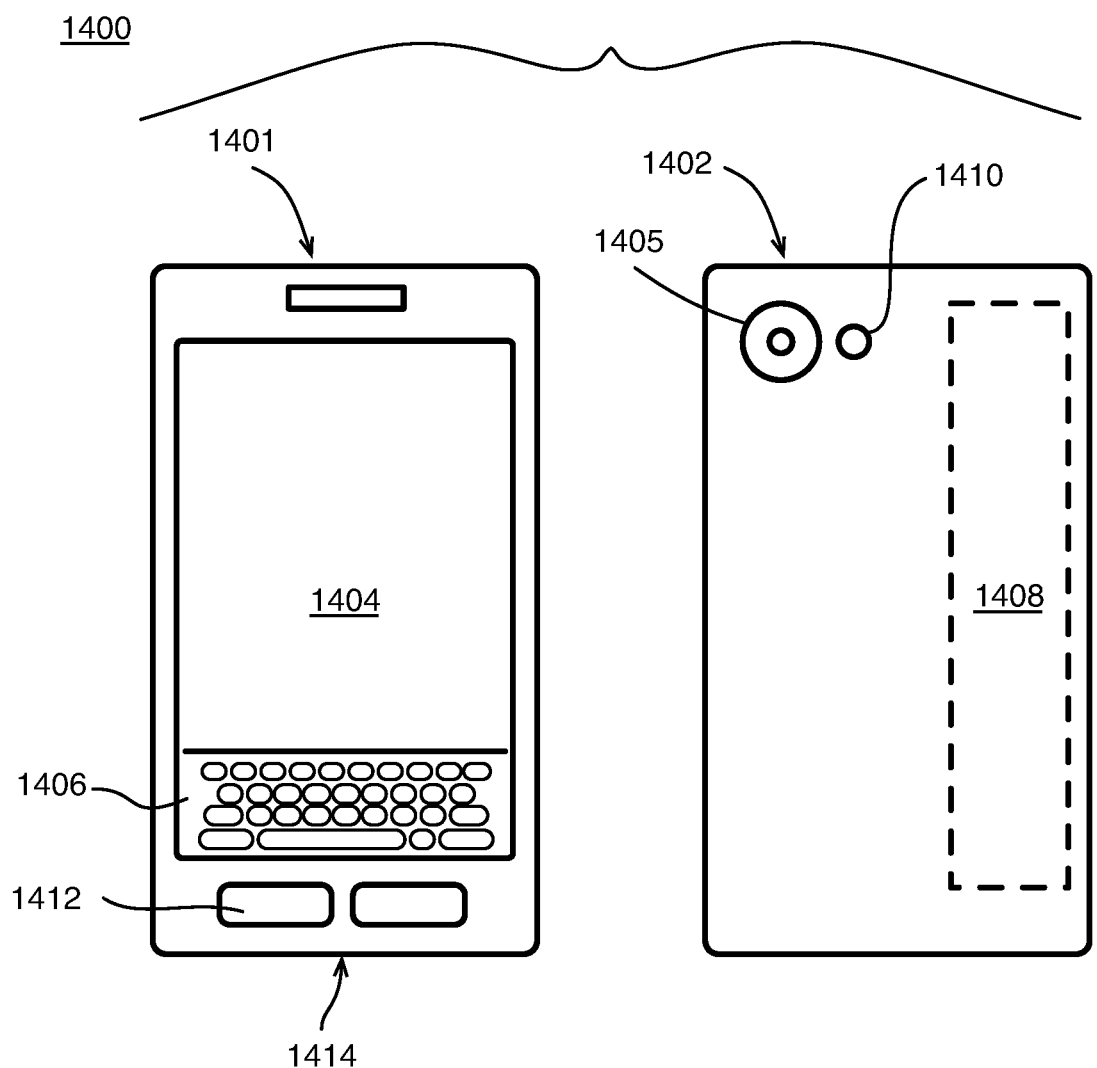
FIG. 14 illustrates another example device, all arranged in accordance with at least some implementations of the present disclosure.

Referring to FIG. 14, a small form factor device 1400 is one example of the varying physical styles or form factors in which systems 1100 or 1200 may be embodied. By this approach, device 1400 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The implementations are not limited in this context.

As shown in FIG. 14, device 1400 may include a housing with a front 1401 and a back 1402. Device 1400 includes a display 1404, an input/output (I/O) device 1406, and an integrated antenna 1408. Device 1400 also may include navigation features 1412. I/O device 1406 may include any suitable I/O device for entering information into a mobile computing device. Examples for I/O device 1406 may include an alphanumeric keyboard, a numeric keypad, a touch pad, input keys, buttons, switches, microphones, speakers, voice recognition device and software, and so forth. Information also may be entered into device 1400 by way of microphone 1414, or may be digitized by a voice recognition device. As shown, device 1400 may include a camera 1405 (e.g., including at least one lens, aperture, and imaging sensor) and a flash 1410 integrated into back 1402 (or elsewhere) of device 1400. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, da to bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the p resent disclosure pertains are deemed to lie within the spirit and scope of the present disclosure.

The following examples pertain to additional implementations.

By one or more example first implementations, a computer-implemented method of de-interlacing for image processing comprises obtaining image data of fields of a video sequence comprising current fields to be de-interlaced into a current frame and at least one reference frame; generating at least one chroma temporal difference measure (chroma TDM) that is a difference between chroma values of the current frame and one of the reference frames, and performed to detect motion of image content from frame to frame; generating at least one luma temporal difference measure (luma TDM) that is a difference between luma values of the current frame and the one reference frame, and performed to detect motion of image content from frame to frame; and determining a type of de-interlacing strategy to apply to at least one pixel location at least partly depending on a selection between a version of the at least one chroma TDM and a version of the luma TDM.

Further to the first implementation, the method provides that the chroma values and the luma values are pixel values of a same single pixel location on both the current frame and the reference frame.

Further to the first implementation, the method provides that the chroma values and the luma values are pixel values of a same single pixel location on both the current frame and the reference frame, while the method comprises selecting among luma TDM, a version of chroma TDM_U, and a version of chroma TDM_V to be the TDM to be used to determine the de-interlacing interpolation strategy to be used, and performing the selecting when the maximum chroma TDM is over a threshold.

Further to the first implementation, the method provides that the chroma values and the luma values are pixel values of a same single pixel location on both the current frame and the reference frame, while the method comprises selecting among luma TDM, a version of chroma TDM_U, and a version of chroma TDM_V to be the TDM to be used to determine the de-interlacing interpolation strategy to be used, and performing the selecting when the maximum chroma TDM is over a threshold. The method also provides that the maximum value among the luma TDM, TDM_U, and TDM_V is selected as the TDM to be used to determine the de-interlacing strategy.

Further to the first implementation, the method provides that the chroma values and the luma values are pixel values of a same single pixel location on both the current frame and the reference frame, while the method comprises selecting among luma TDM, a version of chroma TDM_U, and a version of chroma TDM_V to be the TDM to be used to determine the de-interlacing interpolation strategy to be used, and performing the selecting when the maximum chroma TDM is over a threshold. The method also provides that one or more modifying factors are applied to the chroma TDM_U and chroma TDM_V before performing the selecting.

Further to the first implementation, the method provides that the determining of the de-interlacing interpolation also depends on spatial chroma or luma or both pixel value differences on a single field and whether those differences meet a criteria.

Further to the first implementation, the method provides that the determining of the de-interlacing interpolation also depends on spatial chroma or luma or both pixel value differences on a single field and whether those differences meet a criteria, and that the spatial pixel value differences are formed by comparing absolute sums of regions of horizontal or vertical or both adjacent pixel position differences on the same field.

Further to the first implementation, the method provides that the determining of the de-interlacing interpolation also depends on whether or not a pixel location is on a thin line synthetic pattern, wherein synthetic pattern refers to computer originated rather than having image data originally captured by a camera.

Further to the first implementation, the method provides that the determining of the de-interlacing interpolation also depends on whether or not a pixel location is on a thin line synthetic pattern, wherein synthetic pattern refers to computer originated rather than having image data originally captured by a camera, and that the pixel location being located on the thin line synthetic pattern at least partly depends on comparisons of substantially entire fields of adjacent frames.

Further to the first implementation, the method provides that the selected TDM is used to determine whether or not individual pixel locations have harmonic motion comprising comparing the TDM to a harmonic TDM at least partly determined by comparing pixel values of different fields in the same frame.

Further to the first implementation, the method provides that when a pixel location has harmonic motion, a spatial interpolation alone is used at the pixel location, and de-interlacing temporal information from frame to frame is used when the pixel location does not have harmonic motion.

By one or more example second implementations, a computer-implemented system comprises at least one display; memory to store image data of at least one image; at least one processor communicatively coupled to the memory and display, and the at least one processor to operate by: obtaining image data of fields of a video sequence comprising current fields to be de-interlaced into a current frame; generating at least one field temporal difference value (field TDM value) of luma or chroma pixel values from different fields each having different pixel line locations in a frame than the other fields; determining whether a pixel location indicates harmonic motion at least partly depending on the field TDM value; and de-interlacing the fields by selecting an interpolation strategy to be applied to the pixel location at least partly depending on the determination of harmonic motion.

Further to the second implementation, the system provides that field TDM value is based on a region of differences between adjacent pixel locations one above the other that are both from different fields.

Further to the second implementation, the system provides that the determination of harmonic motion at least partly depends on a comparison of the field TDM values to a version of the TDM determined by selecting between a chroma TDM of chroma difference or a luma TDM for luma differences from frame to frame.

Further to the second implementation, the system provides that the determination of harmonic motion at least partly depends on a comparison of the field TDM values to a version of spatial difference values from pixel locations on the same field.

Further to the second implementation, the system provides that the determination of harmonic motion at least partly depends on a comparison of the field TDM values to a version of spatial difference values from pixel locations on the same field, and where the at least one processor operates by modifying the spatial differences by a synthetic image based harmonic factor.

Further to the second implementation, the system provides that the determination of harmonic motion at least partly depends on a comparison of the field TDM values to a version of spatial difference values from pixel locations on the same field, and where the at least one processor operates by modifying the spatial differences by a natural image based harmonic factor.

Further to the second implementation, the system provides the at least one processor to operate by comparing the field TDM to values modified by a synthetic image based harmonic factor or a natural image based harmonic factor.

Further to the second implementation, the system provides the at least one processor to operate by determining whether harmonic motion is present at least partly depending on whether a pixel location is on an edge of an object on the image content of a frame.

Further to the second implementation, the system provides the at least one processor to operate by determining whether a current pixel location is on an edge of an object by determining a count of pixel locations above or below a reference value from both the same field and different fields all within a predetermined region of pixels having the current pixel location.

By one or more example third implementations, at least one non-transitory computer-readable medium having stored thereon instructions that when executed cause a computing device to operate by: obtaining image data of fields of a video sequence comprising fields to be de-interlaced into frames; detecting whether or not a current frame is the start of a new scene relative to a previous frame; and spatially de-interlacing the current frame when the current frame is a start of a new scene comprising omitting the use of temporal motion detection data to determine which among a number of alternative de-interlacing interpolation strategies to apply on the current frame.

Further to the third implementation, the computing device is to provide that when the current frame is not a start of a new frame, the instructions causing the computing device to operate by: generating at least one chroma temporal difference measure (chroma TDM) that is a difference between chroma values of the current frame and a reference frame of the video sequence, and performed to detect motion of image content from frame to frame; generating a luma temporal difference measure (luma TDM) that is a difference between luma values of the current frame and the reference frame, and performed to detect motion of image content from frame to frame; and determining a type of de-interlacing strategy to apply to at least one pixel location at least partly depending on a selection between a version of at least one chroma TDM and a version of the luma TDM.

Further to the third implementation, the computing device is to provide that selecting a TDM also depends on whether spatial differences of chroma or luma values on a single field meet a criteria.

Further to the third implementation, the computing device is to provide that when the current frame is not a start of a new frame, the instructions causing the computing device to operate by: generating at least one field temporal difference value (field TDM value) of luma or chroma pixel values from different fields each having different pixel line locations in a frame than the other field; determining whether a pixel location has harmonic motion at least partly depending on the field TDM value; and de-interlacing the fields by selecting an de-interlacing strategy to be applied to the pixel location at least partly depending on the determination of harmonic motion.

Further to the third implementation, the computing device is to provide that when the current frame is not a start of a new frame, the instructions causing the computing device to operate by: generating at least one field temporal difference value (field TDM value) of luma or chroma pixel values from different fields each having different pixel line locations in a frame than the other field; determining whether a pixel location has harmonic motion at least partly depending on the field TDM value; de-interlacing the fields by selecting an de-interlacing strategy to be applied to the pixel location at least partly depending on the determination of harmonic motion; and comparing the field TDM to versions of at least one chroma TDM that is based on chroma pixel value differences from frame to frame.

In one or more fifth example implementations, at least one machine readable medium may include a plurality of instructions that in response to being executed on a computing device, causes the computing device to perform the method according to any one of the above examples.

In one or more sixth example implementations, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of de-interlacing for image processing, comprising:
obtaining image data of fields of a video sequence comprising current fields to be de-interlaced into a current frame and at least one reference frame;
generating at least one chroma temporal difference measure (chroma TDM) that is a difference between chroma values of the current frame and one of the reference frames, and performed to detect motion of image content from frame to frame;
generating at least one luma temporal difference measure (luma TDM) that is a difference between luma values of the current frame and the one reference frame, and performed to detect motion of image content from frame to frame; and
determining a type of de-interlacing strategy to apply to at least one pixel location at least partly depending on a selection between a version of the at least one chroma TDM and a version of the luma TDM.

2. The method of claim 1 wherein the chroma values and the luma values are pixel values of a same single pixel location on both the current frame and the reference frame.

3. The method of claim 2 comprising selecting among luma TDM, a version of chroma TDM_U, and a version of chroma TDM_V to be the TDM to be used to determine the de-interlacing strategy to be used, and performing the selecting when the maximum chroma TDM is over a threshold.

4. The method of claim 3 wherein the maximum value among the luma TDM, TDM_U, and TDM_V is selected as the TDM to be used to determine the de-interlacing strategy.

5. The method of claim 3 wherein one or more modifying factors are applied to the chroma TDM_U and chroma TDM_V before performing the selecting.

6. The method of claim 1 wherein the determining of the de-interlacing strategy also depends on spatial chroma or luma or both pixel value differences on a single field and whether those differences meet a criteria.

7. The method of claim 6 wherein the spatial pixel value differences are formed by comparing absolute sums of regions of horizontal or vertical or both adjacent pixel position differences on the same field.

8. The method of claim 1 wherein the determining of the de-interlacing strategy also depends on whether or not a pixel location is on a thin line synthetic pattern, wherein synthetic pattern refers to computer originated data rather than having image data originally captured by a camera.

9. The method of claim 8 wherein the pixel location being located on the thin line synthetic pattern at least partly depends on comparisons of substantially entire fields of adjacent frames.

10. The method of claim 1 wherein the selected TDM is used to determine whether or not individual pixel locations have harmonic motion comprising comparing the TDM to a harmonic TDM at least partly determined by comparing pixel values of different fields in the same frame.

11. The method of claim 1 wherein when a pixel location has harmonic motion, a spatial interpolation alone is used at the pixel location, and de-interlacing temporal information from frame to frame is used when the pixel location does not have harmonic motion.

12. A computer-implemented system comprising:
at least one display;
memory to store image data of at least one image;
at least one processor communicatively coupled to the memory and display, and the at least one processor to operate by:
obtaining image data of fields of a video sequence comprising current fields to be de-interlaced into a current frame;
generating at least one field temporal difference value (field TDM value) of luma or chroma pixel values from different fields each having different pixel line locations in a frame than the other fields;
determining whether a pixel location indicates harmonic motion at least partly depending on the field TDM value; and
de-interlacing the fields by selecting an interpolation strategy to be applied to the pixel location at least partly depending on the determination of harmonic motion.

13. The system of claim 12 wherein field TDM value is based on a region of differences between adjacent pixel locations one above the other that are both from different fields.

14. The system of claim 12 wherein the determination of harmonic motion at least partly depends on a comparison of the field TDM values to a version of the TDM determined by selecting between a chroma TDM of chroma difference or a luma TDM for luma differences from frame to frame.

15. The system of claim 12 wherein the determination of harmonic motion at least partly depends on a comparison of the field TDM values to a version of spatial difference values from pixel locations on the same field.

16. The system of claim 15 comprising modifying the spatial differences by a synthetic image based harmonic factor.

17. The system of claim 15 comprising modifying the spatial differences by a natural image based harmonic factor.

18. The system of claim 12 comprising comparing the field TDM to values modified by a synthetic image based harmonic factor or a natural image based harmonic factor.

19. The system of claim 12 comprising determining whether harmonic motion is present at least partly depending on whether a pixel location is on an edge of an object on the image content of a frame.

20. The system of claim 19 comprising determining whether a current pixel location is on an edge of an object by determining a count of pixel locations above or below a reference value from both the same field and different fields all within a predetermined region of pixels having the current pixel location.

21. At least one non-transitory computer-readable medium having stored thereon instructions that when executed cause a computing device to operate by:
obtaining image data of fields of a video sequence comprising fields to be de-interlaced into frames;
detecting whether or not a current frame is the start of a new scene relative to a previous frame; and spatially de-interlacing the current frame when the current frame is a start of a new scene comprising omitting the use of temporal motion detection data to determine which among a number of alternative de-interlacing interpolation strategies to apply on the current frame, wherein the available alternative de-interlacing interpolation strategies include a chroma-based alternative, a luma-based alternative, and a harmonic-based alternative.

22. The medium of claim 21 wherein when the current frame is not a start of a new frame, the instructions causing the computing device to operate by:
generating at least one chroma temporal difference measure (chroma TDM) that is a difference between chroma values of the current frame and a reference frame of the video sequence, and performed to detect motion of image content from frame to frame;
generating a luma temporal difference measure (luma TDM) that is a difference between luma values of the current frame and the reference frame, and performed to detect motion of image content from frame to frame; and
determining a type of de-interlacing strategy to apply to at least one pixel location at least partly depending on a selection between a version of at least one chroma TDM and a version of the luma TDM.

23. The medium of claim 22 wherein selecting a TDM also depends on whether spatial differences of chroma or luma values on a single field meet a criteria.

24. The medium of claim 21 wherein when the current frame is not a start of a new scene, the instructions causing the computing device to operate by:
generating at least one field temporal difference value (field TDM value) of luma or chroma pixel values from different fields each having different pixel line locations in a frame than the other field;
determining whether a pixel location has harmonic motion at least partly depending on the field TDM value; and
de-interlacing the fields by selecting an de-interlacing strategy to be applied to the pixel location at least partly depending on the determination of harmonic motion.

25. The medium of claim 24 wherein the computing device is to operate by comparing the field TDM to versions of at least one chroma TDM that is based on chroma pixel value differences from frame to frame.

* * * * *